United States Patent
Ogawa et al.

(10) Patent No.: US 11,992,930 B2
(45) Date of Patent: May 28, 2024

(54) INFORMATION PROCESSING APPARATUS AND INFORMATION PROCESSING METHOD, AND ROBOT APPARATUS

(71) Applicant: Sony Corporation, Tokyo (JP)

(72) Inventors: Hiroaki Ogawa, Chiba (JP); Noriko Totsuka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 921 days.

(21) Appl. No.: 16/979,179

(22) PCT Filed: Jan. 7, 2019

(86) PCT No.: PCT/JP2019/000053
§ 371 (c)(1),
(2) Date: Sep. 9, 2020

(87) PCT Pub. No.: WO2019/181144
PCT Pub. Date: Sep. 26, 2019

(65) Prior Publication Data
US 2020/0406469 A1  Dec. 31, 2020

(30) Foreign Application Priority Data
Mar. 20, 2018 (JP) .................. 2018-053566

(51) Int. Cl.
*B25J 11/00* (2006.01)
*G06V 40/16* (2022.01)
(Continued)

(52) U.S. Cl.
CPC ......... *B25J 11/0005* (2013.01); *G06V 40/172* (2022.01); *G10L 15/187* (2013.01); *G10L 15/22* (2013.01); *G10L 17/06* (2013.01)

(58) Field of Classification Search
CPC .. B25J 11/0005; G06V 40/172; G10L 15/187; G10L 15/22; G10L 17/06
See application file for complete search history.

(56) References Cited

U.S. PATENT DOCUMENTS 9,711,148 B1 *  7/2017  Sharifi ................. G10L 17/04
10,395,640 B1 *  8/2019  Beach .................. G10L 15/26
(Continued)

FOREIGN PATENT DOCUMENTS

EP       1760635 A1    1/2010
JP    2004-252111 A    9/2004
(Continued)

OTHER PUBLICATIONS

Meng Weizhi et al; "Surveying the Development of Biometric User Authentication on Mobile Phones",IEEE Communications Surveys &Tutorials,vol. 17,No. 3,Aug. 20, 2015 (Aug. 20, 2015),pp. 1268-1293.XP011667194.DOI:10.1109/COMST.2014.2386915 [retrieved on Aug. 20, 2016] *abstract** p. 1268,left-hand column,line 1—p. 1278,right-hand column,last line.
(Continued)

*Primary Examiner* — Jaime Figueroa
*Assistant Examiner* — Mohamad O El Sayah
(74) *Attorney, Agent, or Firm* — XSENSUS LLP

(57) ABSTRACT

An information processing apparatus and an information processing method, and a robot apparatus that process information to be used for user identification and the like are provided.
An information processing apparatus for performing processing related to a first device configured to autonomously behave to a user identified by an identification device, includes an acquisition unit configured to acquire a state of the identification device, and a decision unit configured to decide a behavior of the first device on the basis of the state. The decision unit decides a behavior of the first device for collecting voice data from a user whose voice data is insufficient, and decides a behavior of the first device for collecting face image data from a user whose face image data is insufficient, from the user.

18 Claims, 12 Drawing Sheets

(51) Int. Cl.
*G10L 15/187* (2013.01)
*G10L 15/22* (2006.01)
*G10L 17/06* (2013.01)

(56) References Cited

U.S. PATENT DOCUMENTS

| | | | |
|---|---|---|---|
| 2004/0215463 | A1 | 10/2004 | Aoyama |
| 2006/0230140 | A1 | 10/2006 | Aoyama |
| 2008/0002862 | A1 | 1/2008 | Matsugu |
| 2014/0223548 | A1* | 8/2014 | Wassingbo ....... H04N 21/25875 726/19 |
| 2015/0067822 | A1* | 3/2015 | Randall .................. G06F 21/32 726/17 |
| 2016/0063998 | A1* | 3/2016 | Krishnamoorthy ..... G10L 15/22 704/254 |
| 2017/0084278 | A1* | 3/2017 | Jung ....................... G10L 17/02 |
| 2018/0040325 | A1* | 2/2018 | Melanson ............... G10L 17/02 |
| 2018/0293236 | A1* | 10/2018 | Xiang .................. G06V 40/161 |
| 2018/0366124 | A1* | 12/2018 | Cilingir ................ G10L 17/04 |
| 2019/0147046 | A1* | 5/2019 | Deng .................... G06V 40/12 707/746 |

FOREIGN PATENT DOCUMENTS

| | | |
|---|---|---|
| JP | 2006-285882 A | 10/2006 |
| JP | 2007-065766 A | 3/2007 |
| JP | 2008-009914 A | 1/2008 |

OTHER PUBLICATIONS

International Search Report and Written Opinion dated Mar. 12, 2019 for PCT/JP2019/000053 filed on Jan. 7, 2019, 9 pages including English Translation of the International Search Report.

\* cited by examiner

| TRANSITION SOURCE STATE | INPUT COMMAND | REGISTRATION STATE | TRANSITION PROBABILITY | TRANSITION DESTINATION STATE |
|---|---|---|---|---|
| 001 | "LET US PLAY" | SUFFICIENT | 0.2 | 002 (WORD CHAIN GAME) |
| 001 | "LET US PLAY" | SUFFICIENT | 0.3 | 003 (CHASING) |
| 001 | "LET US PLAY" | SUFFICIENT | 0.5 | 001 (DO NOTHING) |
| 001 | "LET US PLAY" | INSUFFICIENT | 0.9 | 002 (WORD CHAIN GAME) |
| 001 | "LET US PLAY" | INSUFFICIENT | 0 | 003 (CHASING) |
| 001 | "LET US PLAY" | INSUFFICIENT | 0.1 | 001 (DO NOTHING) |

INFORMATION PROCESSING APPARATUS AND INFORMATION PROCESSING METHOD, AND ROBOT APPARATUS

CROSS-REFERENCE TO RELATED APPLICATIONS

The present application is based on PCT filing PCT/JP2019/000053, filed Jan. 7, 2019, which claims priority to JP 2018-053566, filed Mar. 20, 2018, the entire contents of each are incorporated herein by reference.

TECHNICAL FIELD

The technology disclosed in this specification relates to an information processing apparatus and an information processing method, and a robot apparatus that process information to be used for user identification and the like.

BACKGROUND ART

In interaction with a robot, by the robot identifying a user, a behavior different for each user can be performed. For example, in the case of a pet-type robot, a behavior can be performed in such a manner that, while the robot comes closer to a user registered as an owner, the robot gives a bark to an unknown user like a watch dog, and so on. Furthermore, there has been also proposed a dialogue system that acquires information unique to a user by analyzing a dialogue with the user, and generates dialogue content using information unique to the user and non-unique information (e.g., refer to Patent Document 1). In the dialogue system including a robot, a function of identifying a user is extremely important for providing a service suitable for the user.

A user identification technology that uses information regarding a face or voice of a user has been widely known. The user identification technology can preliminarily learn information regarding a face or voice of a user, calculate a similarly between a face or voice detected by a robot and learned data, and determine whether or not the detected user is a known user and determine who the detected user is.

Learning data of a face, voice, and the like of the user changes in accordance with growth, aging, and the like of the user. It is known that, if preliminarily learned information regarding a face or voice of the user becomes old, user identification performance declines. For example, in the case of performing identification using information regarding voice, identification performance is affected even in a period of about a few months. Accordingly, for maintaining identification performance, it is necessary to constantly learn up-to-date data of a face or voice of the user.

A work in which a robot learns a face or voice forces a user to make specific speech or stay in a specific posture, which places a burden on the user. Therefore, there has been proposed a speech recognition apparatus that promotes a user to make speech by a game such as a word chain game or tongue twister, and collects voice data necessary for learning, without causing the user to become conscious of preprocessing for learning (e.g., refer to Patent Document 2).

CITATION LIST

Patent Document

Patent Document 1: Japanese Patent Application Laid-Open No. 2017-62602

Patent Document 2: Japanese Patent Application Laid-Open No. 2017-3611

SUMMARY OF THE INVENTION

Problems to be Solved by the Invention

The object of the technology disclosed in this specification is to provide to an information processing apparatus and an information processing method, and a robot apparatus that efficiently collect information to be used for user identification.

Solutions to Problems

The technology disclosed in this specification has been devised in view of the above-described issues, and according to the first aspect thereof, an information processing apparatus for performing processing related to a device configured to autonomously behave to an object identified by an identification device, includes
an acquisition unit configured to acquire a state of the identification device, and
a decision unit configured to decide a behavior of the device on the basis of the state.

For example, the identification device includes a speaker identification device configured to identify a speaker from voice data of a user and a face identification device configured to identify a face image of the user. Furthermore, the decision unit decides a behavior of the device for collecting voice data from a user whose voice data is insufficient, and decides a behavior of the device for collecting face image data of a user whose face image data is insufficient, from the user.

Furthermore, according to the second aspect of the technology disclosed in this specification, an information processing method for performing processing related to a device configured to autonomously behave to an object identified by an identification device, includes
an acquisition step of acquiring a state of the identification device, and
a decision step of deciding a behavior of the device on the basis of the state.

Furthermore, according to the third aspect of the technology disclosed in this specification, a robot apparatus includes
a sensor unit,
an identification unit configured to identify an object on the basis of an output of the sensor unit,
a driving unit, and
a decision unit configured to decide a behavior that uses the driving unit, on the basis of a state of the identification unit.

Effects of the Invention

According to the technology disclosed in this specification, there can be provided an information processing apparatus and an information processing method, and a robot apparatus that can efficiently collect information to be used for user identification and the like, in a state in which burdensome feeling felt by the user is small.

Note that the effects described in this specification are merely provided as exemplary effects, and the effects of the present invention are not limited to these. Furthermore, in some cases, the present invention further causes additional effects aside from the above-described effects.

Yet another object, features, and advantages of the technology disclosed in this specification will become apparent by embodiments to described later and more detailed description that is based on the attached drawings.

BRIEF DESCRIPTION OF DRAWINGS

FIG. 5 is a diagram illustrating a configuration example of an actuator of the legged robot 1, a control system of the actuator, and the like.

MODE FOR CARRYING OUT THE INVENTION

Hereinafter, embodiments of the technology disclosed in this specification will be described in detail with reference to the drawings.

Information to be used for user identification, such as a face or voice, needs to have a variation in addition to mere freshness. For example, if there is only information regarding a full face and a right-oriented face of the user, it is difficult to perform user identification by detecting a left-oriented face, or identification performance declines. Furthermore, if there is only voice information regarding "a" and "i" spoken by the user, it is difficult to perform user identification when only voice of "u" can be detected, or identification performance declines.

It is possible to promote the user to perform an operation or a behavior for collecting explicitly-lacking information. For example, when information regarding a left-oriented face of the user is lacking, a robot can collect information regarding a left-oriented face of the user, by giving an instruction "face to the left" to the user, or when user speech of "u" is lacking, the robot can collect voice of the user that includes "u", by giving an instruction "pronounce "u" toward here" to the user. However, the user needs to follow a robot side instruction, and burdensome feeling felt by the user increases.

On the other hand, if usual voice of the user or an image of a usual face of the user is continued to be collected, there is a possibility that information sufficient for maintaining high identification performance can be collected, but it takes a long time for information collection for realizing identification performance of a certain level of more. Furthermore, until sufficient information is collected, identification performance remains at a low level.

In view of the foregoing, in this specification, an information processing apparatus and an information processing method, and a robot apparatus that can efficiently collect information to be used for user identification, in a state in which burdensome feeling felt by the user is small will be hereinafter proposed.

First Embodiment

Figure 1:
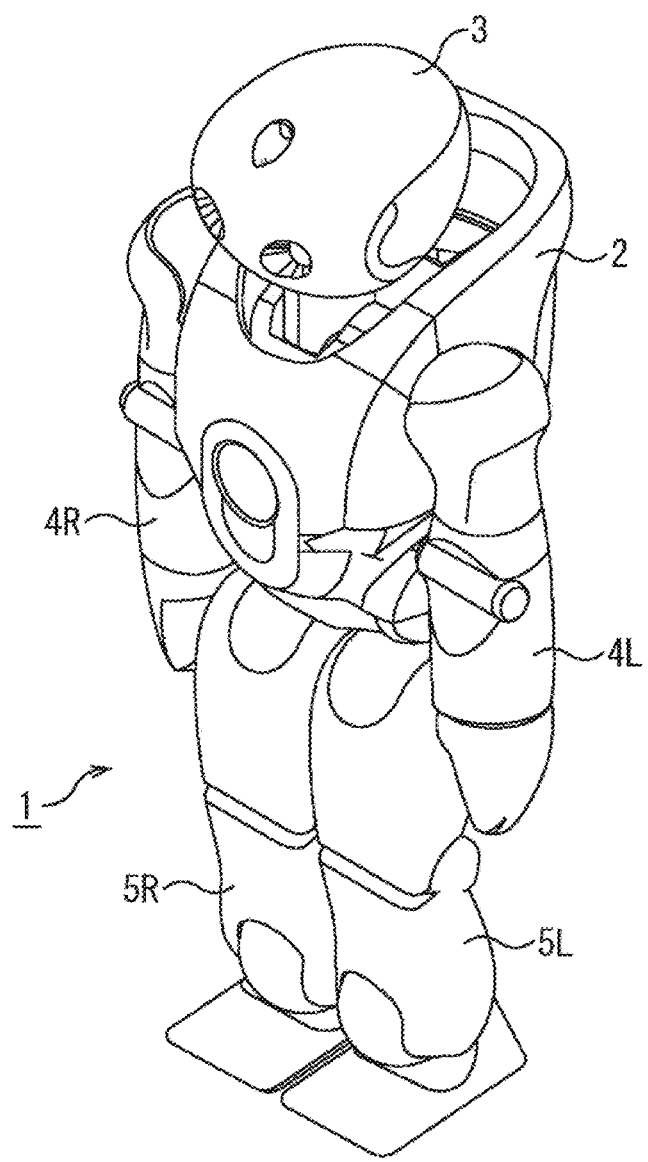
FIG. 1 is a perspective view of an exterior of a legged robot 1.

FIG. 1 illustrates a perspective view of an exterior of a legged robot 1 to which the technology disclosed in this specification can be applied.

The legged robot 1 can support a human activity while freely moving in a dwelling environment of a human or other various locations in daily life. Furthermore, the legged robot 1 can autonomously behave in accordance with an internal state (anger, sadness, joy, fun, etc.), and can further represent a basic operation performed by a human.

The exterior of the legged robot 1 illustrated in the drawing has a configuration in which a head exterior unit 3 is coupled to a predetermined position of a body exterior unit 2, and two left and right arm exterior units 4R/L (Right/Left: right arm/left arm) and two left and right leg exterior units 5R/L are coupled.

Figure 2:
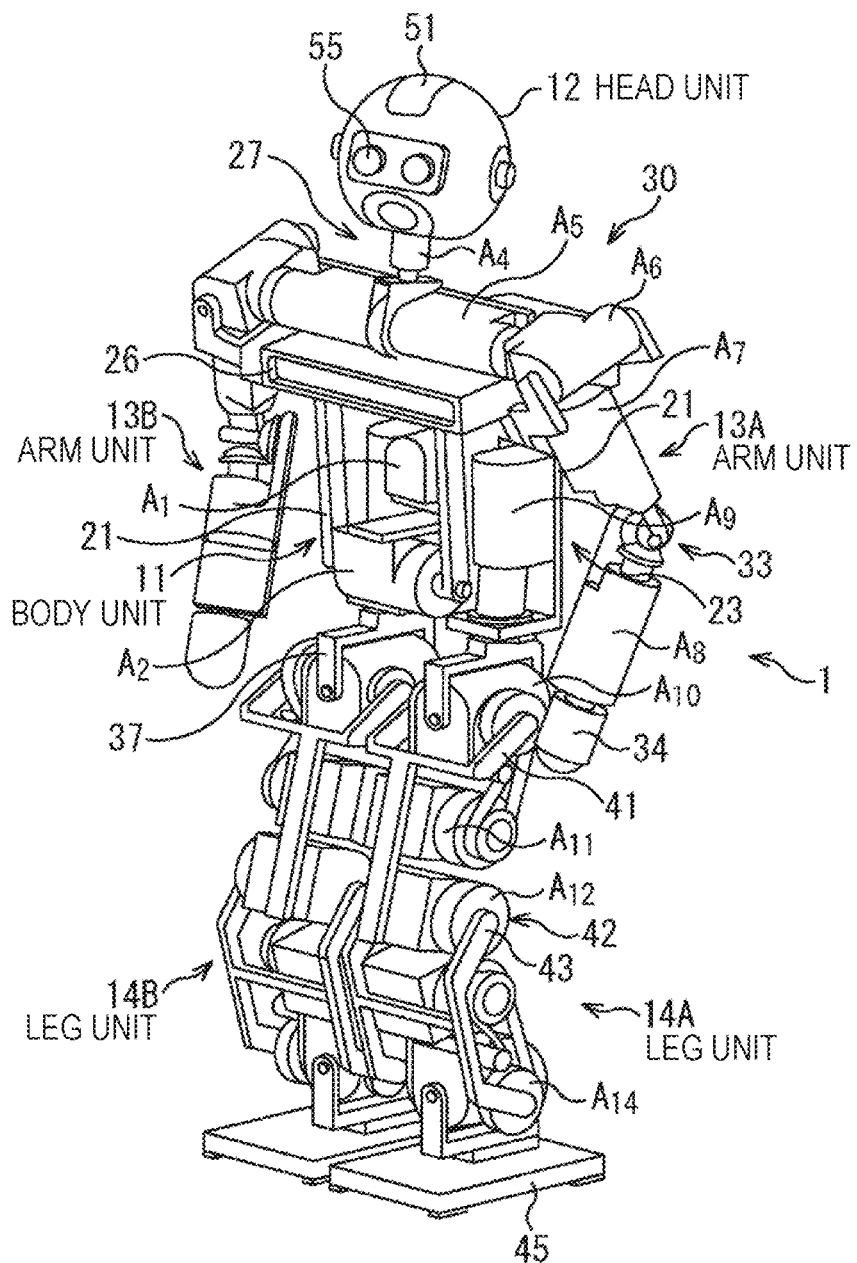
FIG. 2 is a diagram illustrating an internal configuration of an exterior of the legged robot 1.
Figure 3:
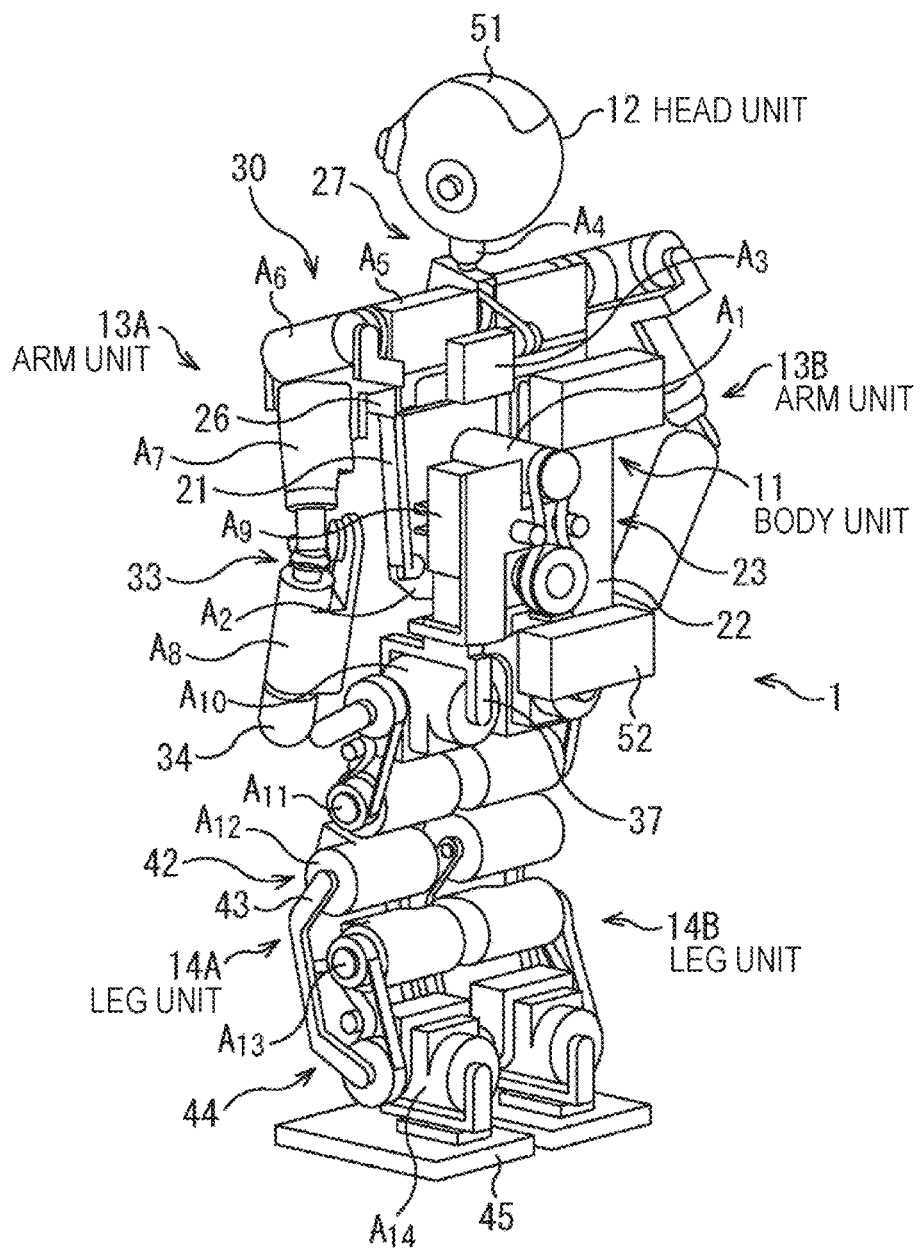
FIG. 3 is a diagram illustrating an internal configuration of an exterior of the legged robot 1.
Figure 4:
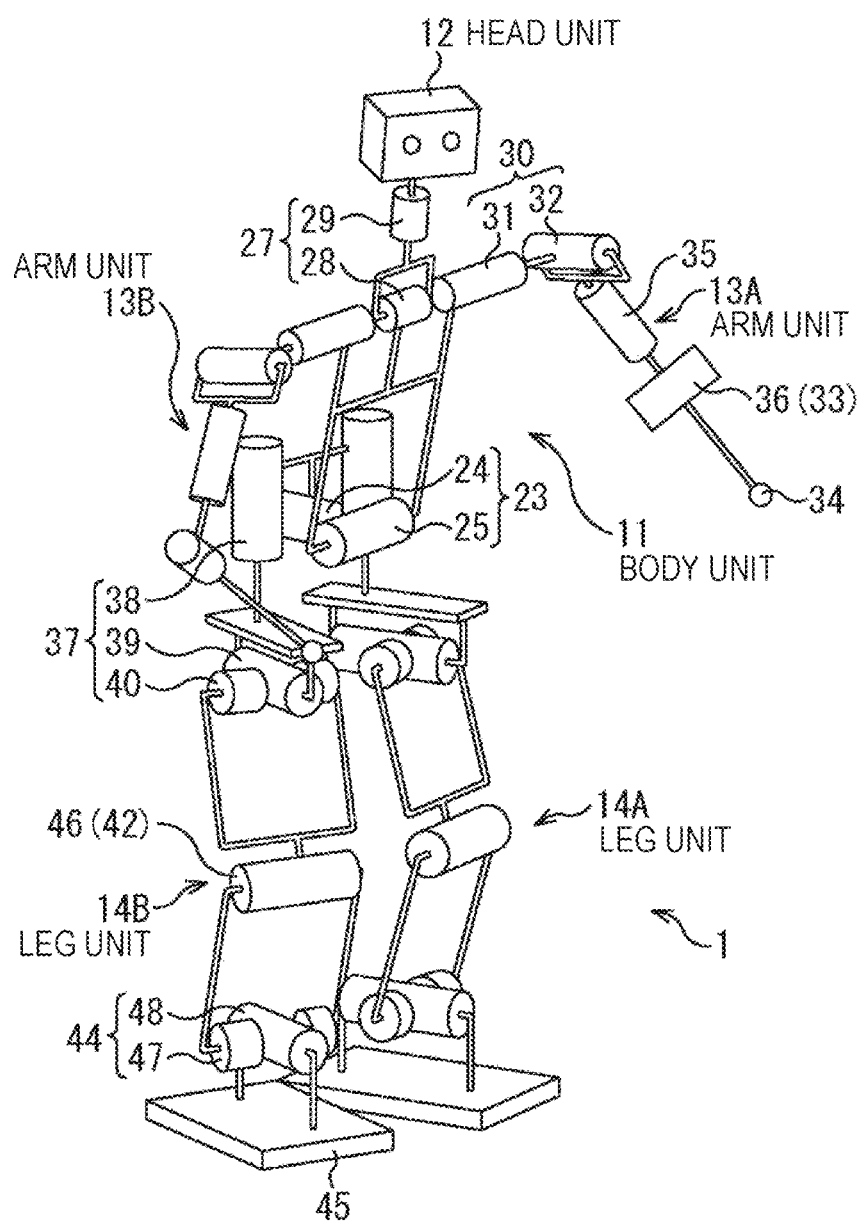
FIG. 4 is a diagram schematically illustrating an axial configuration of the legged robot 1.

FIGS. 2 and 3 each illustrate an internal configuration of an exterior of the legged robot 1. At this time, FIG. 2 is a perspective view illustrating an internal of the legged robot 1 viewed from a front direction, and FIG. 3 is a perspective view illustrating an internal of the legged robot 1 viewed from a rear direction. Furthermore, FIG. 4 schematically illustrates an axial configuration of the legged robot 1. Each cylinder drawn in FIG. 4 corresponds to a joint mechanism, and represents that the legged robot 1 has joint flexibility rotatable about an axis of the cylinder. Hereinafter, an internal configuration of the legged robot 1 will be described with reference to FIGS. 2 to 4.

In the legged robot 1, a head unit 12 is provided above a body unit 11. Furthermore, arm units 13A and 13B having a similar configuration are respectively attached to predetermined positions at the upper left and right of the body unit 11. Furthermore, leg units 14A and 14B having a similar configuration are respectively attached to predetermined positions at the lower left and right of the body unit 11. The head unit 12 is provided with a touch sensor 51 and a display unit 55.

The body unit 11 has a configuration in which a frame 21 forming a body trunk upper portion and a waist base 22 forming a body trunk lower portion are coupled via a waist joint mechanism 23. By driving an actuator A1 of the waist joint mechanism 23 fixed to the waist base 22 of the body trunk lower portion, the body trunk upper portion can be rotated about a roll axis 24 with respect to the body trunk lower portion. Furthermore, by driving an actuator A2 of the waist joint mechanism 23, the body trunk upper portion can be rotated about a pitch axis 25 with respect to the body trunk lower portion. Note that the actuator A1 and the actuator A2 can be independently driven.

The head unit 12 is attached via a neck joint mechanism 27 to a top surface center portion of a shoulder base 26 fixed to an upper end of the frame 21. By driving an actuator A3 of the neck joint mechanism 27, the head unit 12 can be rotated about a pitch axis 28 with respect to the frame 21 (body trunk upper portion). Furthermore, by driving an actuator A4 of the neck joint mechanism 27, the head unit 12 can be rotated about a yaw axis 29 with respect to the frame 21 (body trunk upper portion). Note that the actuator A3 and the actuator A4 can be independently driven.

The arm units 13A and 13B respectively attached to the left and right of the shoulder base 26 via a shoulder joint mechanism 30. By driving an actuator A5 of the shoulder joint mechanism 30, the arm unit 13A can be rotated about a pitch axis 31 with respect to the shoulder base 26. Furthermore, by driving an actuator A6 of the shoulder joint mechanism 30, the arm unit 13A can be rotated about a roll axis 32 with respect to the shoulder base 26. The same applies to the arm unit 13B. Note that the actuator A5 and the actuator A6 can be independently driven.

The arm units 13A and 13B include an actuator A7 forming an upper arm portion, an actuator A8 forming a front arm portion that is coupled to an output shaft of the actuator A7 via an elbow joint mechanism 33, and a hand portion 34 attached to the leading end of the front arm portion.

In the arm unit 13A, by driving the actuator A7 of the upper arm portion, the front arm portion can be rotated about a yaw axis 35 with respect to the upper arm portion. Furthermore, by driving the actuator A8 of the front arm portion, the front arm portion can be rotated about a pitch axis 36 with respect to the upper arm portion. The same applies to the arm unit 13B. Note that the actuator A7 and the actuator A8 can be independently driven.

The leg units 14A and 14B are attached to the waist base 22 of the body trunk lower portion via a hip joint mechanism 37. By respectively driving actuators A9 to A11 of the hip joint mechanism 37, the leg unit 14A can be rotated about a yaw axis 38, a roll axis 39, and a pitch axis 40 with respect to the waist base 22. The same applies to the leg unit 14B. Note that the actuators A9 to A11 can be independently driven.

The leg units 14A and 14B include a frame 41 forming a femoral region, a frame 43 forming a leg region that is coupled to a lower end of the frame 41 via a knee joint mechanism 42, and a foot region 45 coupled to a lower end of the frame 43 via an ankle joint mechanism 44.

In the leg unit 14A, by driving an actuator A12 forming the knee joint mechanism 42, the frame 43 of the leg region can be rotated about a pitch axis 46 with respect to the frame 41 of the femoral region. Furthermore, by respectively driving actuators A13 and A14 of the ankle joint mechanism 44, the foot region 45 can be rotated about a pitch axis 47 and a roll axis 48 with respect to the frame 43 of the leg region. The same applies to the leg unit 14B. Note that the actuators A12 to A14 can be independently driven.

Furthermore, a control unit 52 is provided on the rear surface side of the waist base 22 forming the body trunk lower portion of the body unit 11. The control unit 52 is a box incorporating a main control unit 61 and a peripheral circuit 62 (refer to FIG. 5 for both components), and the like, which will be described later.

Figure 5:
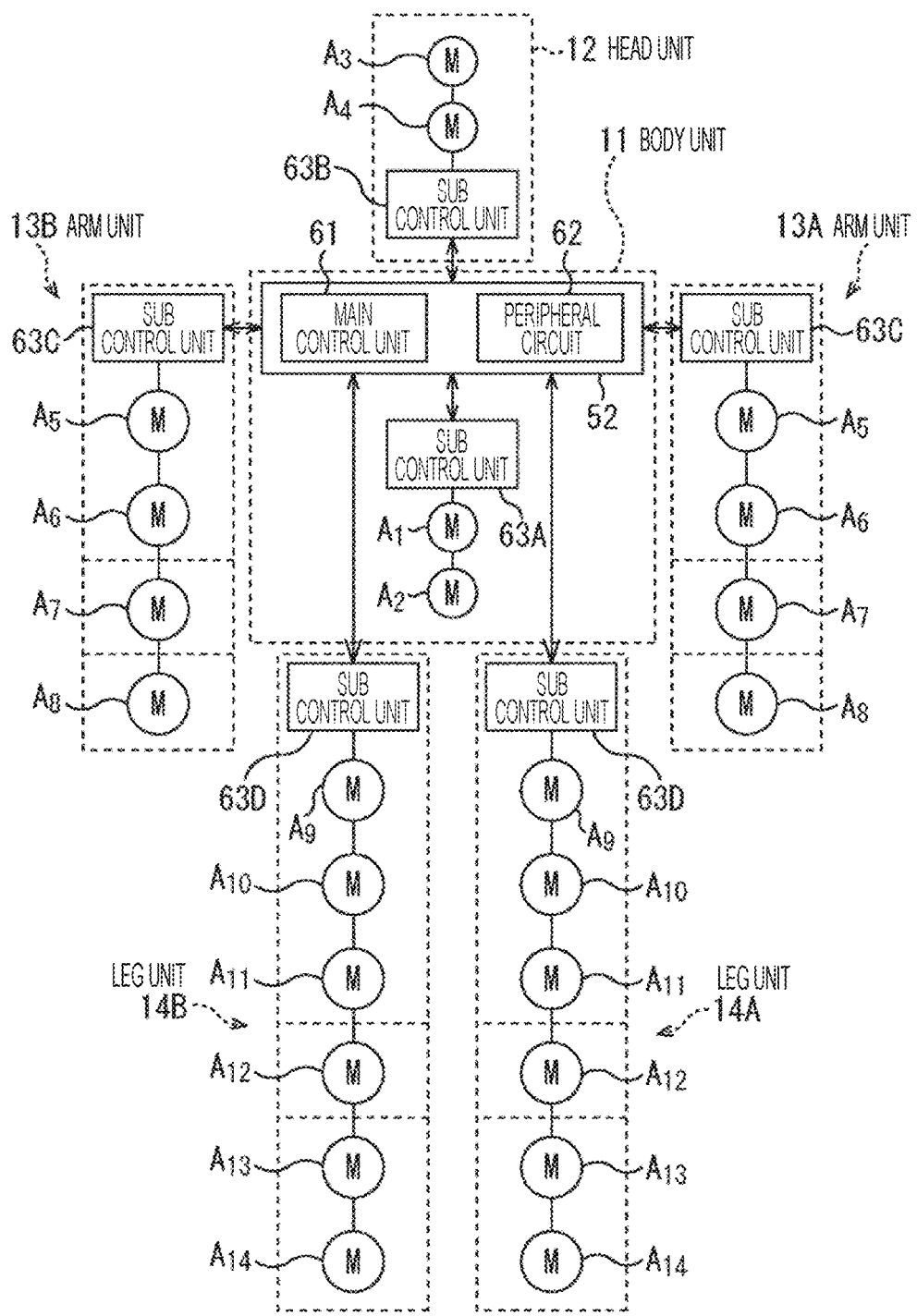

FIG. 5 illustrates a configuration example of an actuator of the legged robot 1, a control system of the actuator, and the like.

The main control unit 61 that comprehensively controls the overall operation of the legged robot 1, the peripheral circuit 62 including a power circuit, a communication circuit, and the like, a battery 74 (refer to FIG. 6), and the like are stored in the control unit 52.

Sub control units 63A to 63D provided in the respective components (the body unit 11, the head unit 12, the arm units 13A and 13B, and the leg units 14A and 14B) are connected to the control unit 52. Then, the control unit 52 supplies necessary power-supply voltage to these sub control units 63A to 63D, and communicates with the sub control units 63A to 63D.

Furthermore, each of the sub control units 63A to 63D is connected to the corresponding actuators A1 to A14 in the corresponding components 11 to 14. Then, on the basis of various control commands supplied from the main control unit 61, the sub control units 63A to 63D control the actuators A1 to A14 in the corresponding components 11 to 14 to be driven to a designated state.

Figure 6:
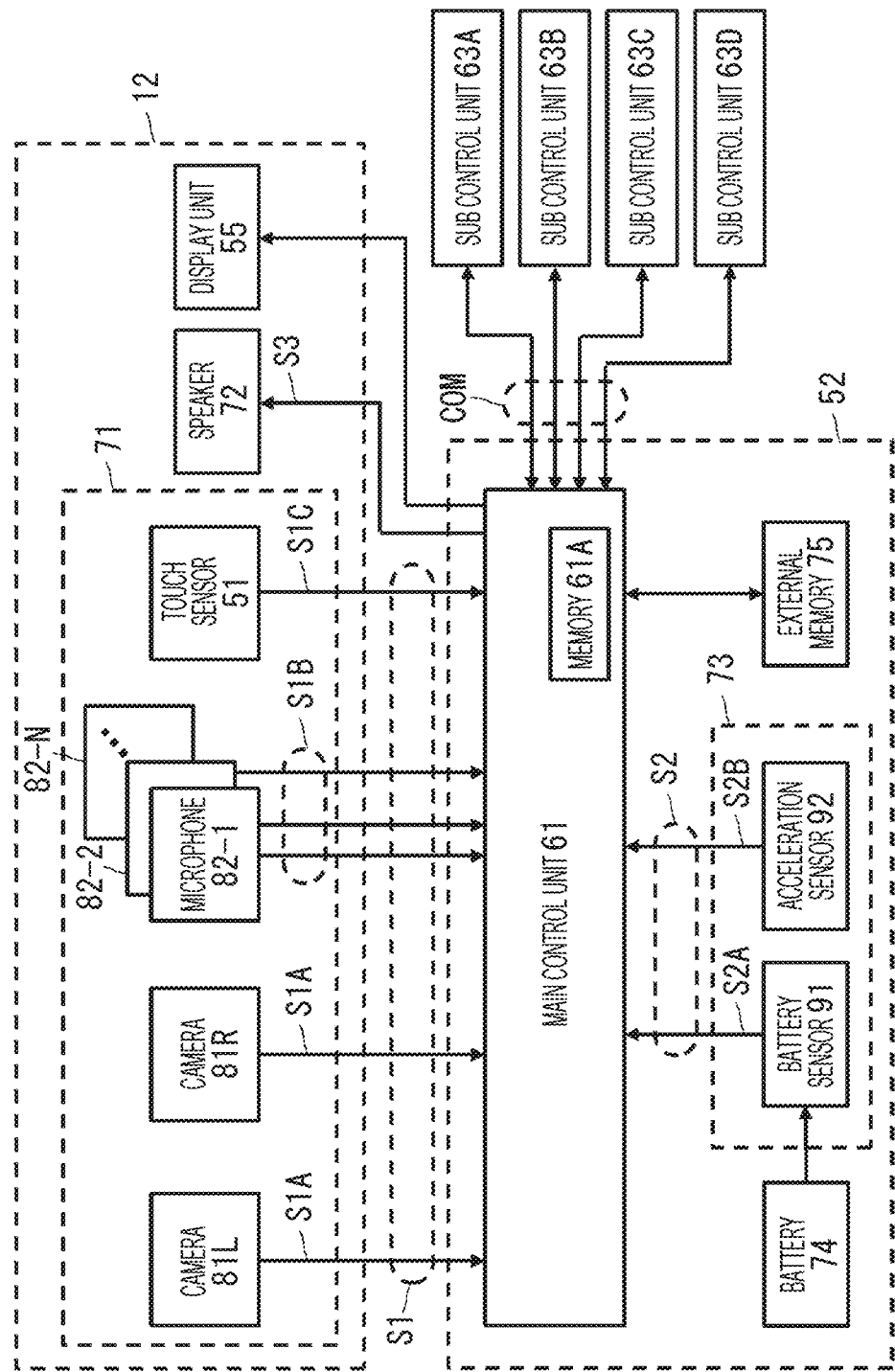
FIG. 6 is a block diagram illustrating an internal configuration example of an electrical system of the legged robot 1.

FIG. 6 illustrates an internal configuration example of an electrical system of the legged robot 1.

In the head unit 12, cameras 81L and 81R functioning as left and right "eyes" of the legged robot 1, microphones 82-1 to 82-N functioning as "ears", the touch sensor 51, and the like are provided as an external sensor unit 71 at respective predetermined positions. As the cameras 81L and 81R, a camera including an image sensor such as a complementary metal oxide semiconductor (CMOS) image sensor or a charge coupled device (CCD) image sensor, for example, is used. Furthermore, in the head unit 12, a speaker 72, the display unit 55, and the like are provided as an output unit at respective predetermined positions. The speaker 72 outputs voice and functions as a "mouth". Furthermore, a state of the legged robot 1 and a response from the user are displayed on the display unit 55.

Furthermore, the main control unit 61, the battery 74, an internal sensor unit 73 including a battery sensor 91, an acceleration sensor 92, and the like, and an external memory 75 are provided in the control unit 52.

The cameras 81L and 81R of the external sensor unit 71 capture an image of an ambient situation, and transmit an obtained image signal S1A to the main control unit 61. The microphones 82-1 to 82-N collect various types of command voice (voice commands) such as "walk", "stop" and "raise the right hand up" that are given as a voice input from the user, and transmit an obtained voice signal S1B to the main control unit 61. Note that, in the following description, in a case where there is no need to make a distinction between the N microphones 82-1 to 82-N, the N microphones 82-1 to 82-N will be referred to as microphones 82.

Furthermore, the touch sensor 51 of the external sensor unit 71 is provided on the upper portion of the head unit 12 as illustrated in FIGS. 2 and 3, for example, detects pressure received by physical action from the user such as "stroke" or "hit", and transmits the detection result to the main control unit 61 as a pressure detection signal S1C.

The battery sensor 91 of the internal sensor unit 73 detects an energy remaining amount of the battery 74 at every predetermined cycle, and transmits a detection result to the main control unit 61 as a battery remaining amount detection signal S2A. Furthermore, the acceleration sensor 92 detects acceleration in three axial directions (x-axis, y-axis, and z-axis) of the movement of the legged robot 1 at every predetermined cycle, and transmits the detection result to the main control unit 61 as an acceleration detection signal S2B.

The external memory 75 stores programs, data, control parameters, and the like, and supplies the programs and the data as necessary to a memory 61A incorporated in the main control unit 61. Furthermore, the external memory 75 receives data and the like from the memory 61A and stores the received data. Note that the external memory 75 is formed to be detachable from the legged robot 1 (or the control unit 52).

The main control unit 61 incorporates the memory 61A. The memory 61A stores programs and data, and the main control unit 61 performs various types of processing by executing programs stored in the memory 61A. In other words, on the basis of the image signal S1A, the voice signal S1B, and the pressure detection signal S1C (hereinafter, these signals will be collectively referred to as an external sensor signal S1) that are respectively supplied from the cameras 81L and 81R, the microphones 82, and the touch sensor 51 of the external sensor unit 71, and the battery remaining amount detection signal S2A and the acceleration detection signal S2B (hereinafter, these signals will be collectively referred to as an internal sensor signal S2) that are respectively supplied from the battery sensor 91, the acceleration sensor, and the like of the internal sensor unit 73, the main control unit 61 determines an ambient situation and an internal situation of the legged robot 1, commands from the user, the presence or absence of an action from the user, or the like.

Then, the main control unit 61 decides a behavior of the legged robot 1 on the basis of a determination result as to an ambient situation and an internal situation of the robot 1, commands from the user, or the presence or absence of an action from the user, control programs prestored in the internal memory 61A, various control parameters stored in the external memory 75 attached at this time, or the like, generates a control command that is based on the decision result, and transmits the generated control command to the corresponding sub control units 63A to 63D. The sub control units 63A to 63D control the driving of the actuators A1 to A14 corresponding to each of the sub control units 63A to 63D, on the basis of the control command supplied from the main control unit 61. Therefore, the legged robot 1 performs a behavior such as, for example, swinging the head unit 12 vertically or horizontally, raising the arm unit 13A or the arm unit 13B up, or walking by alternately driving the leg units 14A and 14B.

Furthermore, by providing a predetermined voice signal S3 to the speaker 72 as necessary, the main control unit 61 causes voice that is based on the voice signal S3 to be output to the outside, and for example, when voice is detected, displays a response to the user such as "Who is it?" on the display unit 55 on the basis of a display signal S4. Moreover, by outputting a drive signal to LEDs (not illustrated) apparently functioning as "eyes" that are provided at predetermined positions of the head unit 12, and blinking the LEDs, the main control unit 61 causes the LEDs to function as the display unit 55.

In this manner, the legged robot 1 can autonomously behave on the basis of an ambient situation and an internal situation, commands from the user, the presence or absence of an action from the user, or the like.

Figure 7:
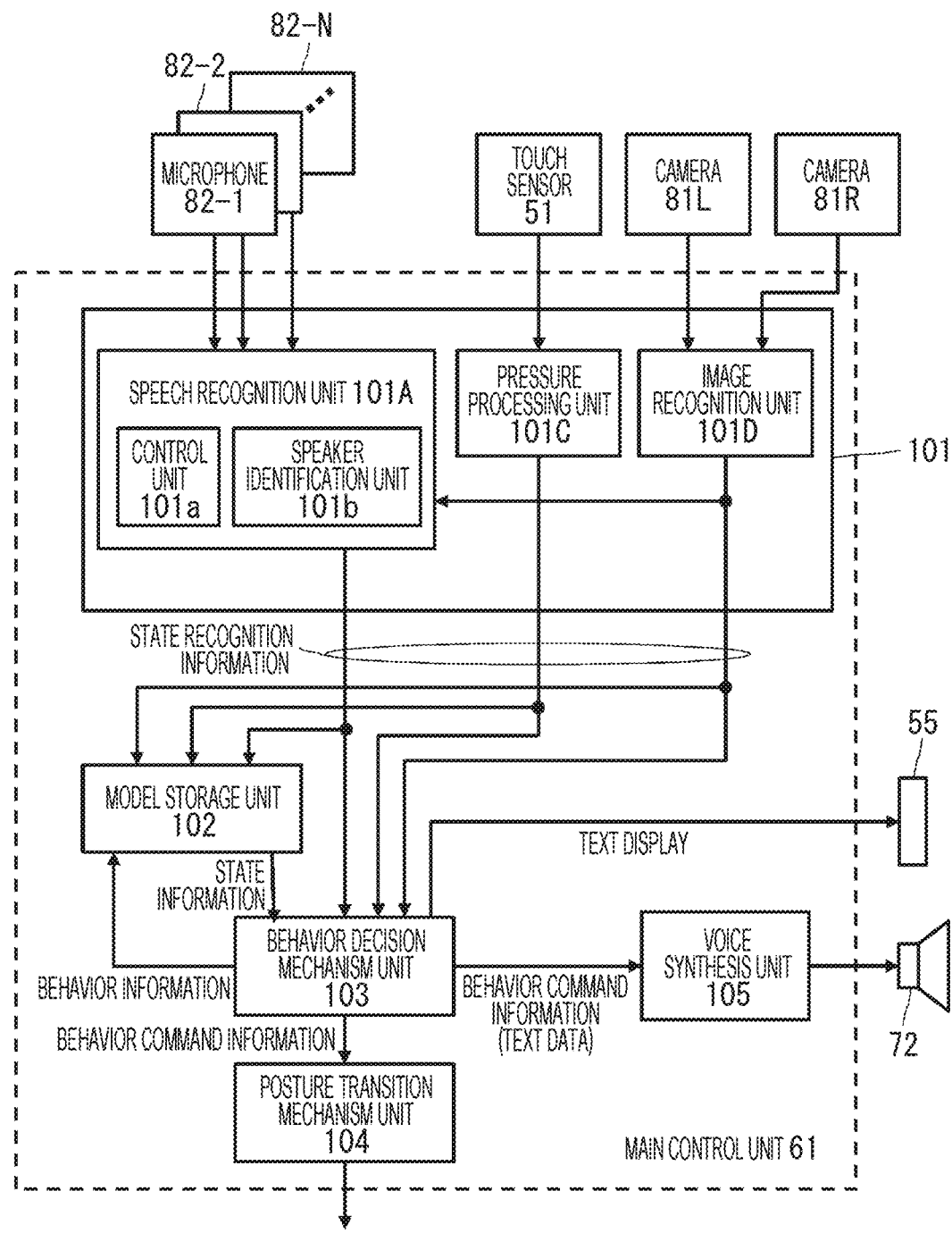
FIG. 7 is a block diagram illustrating a functional configuration example of a main control unit 61.

FIG. 7 illustrates a functional configuration example of the main control unit 61 in FIG. 6. Note that the functional configurations illustrated in FIG. 7 are implemented by the main control unit 61 executing control programs stored in the memory 61A. Nevertheless, a part or all of the functional configurations illustrated in the main control unit 61 in the drawing can be implemented on the outside (including cloud) of the legged robot 1.

The main control unit 61 includes a state recognition information processing unit 101, a model storage unit 102, a behavior decision mechanism unit 103, a posture transition mechanism unit 104, and a voice synthesis unit 105. The state recognition information processing unit 101 recognizes a specific external state. The model storage unit 102 stores models of feeling, instinct, a growth state, or the like of the robot 1 that are to be updated on the basis of a recognition result of the state recognition information processing unit 101 and the like. The behavior decision mechanism unit 103 decides a behavior of the robot 1 on the basis of a recognition result of the state recognition information processing unit 101 and the like. The posture transition mechanism unit 104 causes the robot 1 to actually perform a behavior, on the basis of a decision result of the behavior decision mechanism unit 103. The voice synthesis unit 105 generates a synthetic tone to be output as voice from the speaker 72. Nevertheless, a part or all of the functional configurations denoted by the reference numerals 101 to 105 can also be implemented on the outside (including cloud) of the legged robot 1, instead of inside the main control unit 61. Hereinafter, each component will be described in detail.

While the power of the robot 1 is turned on, voice signals, image signals, and pressure detection signals are constantly input to the state recognition information processing unit 101 from the microphones 82, the cameras 81L and 81R, and the touch sensor 51. Then, on the basis of voice signals, image signals, and pressure detection signals that are supplied from the microphones 82, the cameras 81L and 81R, and the touch sensor 51, the state recognition information processing unit 101 recognizes a specific external state, a specific action from the user, an instruction from the user, and the like, and constantly outputs state recognition information indicating the recognition result, to the model storage unit 102 and the behavior decision mechanism unit 103.

The state recognition information processing unit 101 includes a speech recognition unit 101A, a pressure processing unit 101C, and an image recognition unit 101D.

The speech recognition unit 101A detects the presence or absence of voice on the basis of the voice signal S1B supplied from each of the microphones 82-1 to 82-N, and when voice is detected, outputs voice detection to the behavior decision unit 103. The speech recognition unit 101A includes a control unit 101*a* that comprehensively controls input-output of information and speech recognition processing of an input voice signal, and a speaker identification unit 101*b* that performs speaker identification on the input voice signal.

Furthermore, the speech recognition unit 101A performs speech recognition, and notifies the model storage unit 102 and the behavior decision mechanism unit 103 of commands such as "let us play", "stop", and "raise the right hand up", for example, and another speech recognition result, as state recognition information.

Moreover, the speech recognition unit 101A performs speaker identification on speech recognition target voice, by the speaker identification unit 101*b*, and notifies the model storage unit 102 and the behavior decision mechanism unit 103 of the result as state recognition information. At this time, the speech recognition unit 101A determines a registration state of speaker identification voice for an identified user as an internal state of the speaker identification unit 101*b* ("voice of the user is insufficient", "voice of the user is sufficient", and the like), and outputs the registration state together with state recognition information (speech recognition result or speaker identification result). That is, the speech recognition unit 101A transmits insufficiency of speaker identification voice of a user identified as a speaker, to the behavior determination/decision mechanism unit 103. Note that the details of a method of determining a registration state of speaker identification voice for a user (in other words, whether speaker identification data of the user is sufficient or insufficient) will be described later.

The pressure processing unit 101C processes the pressure detection signal S1C supplied from the touch sensor 51. Then, when short-time pressure with a predetermined threshold or more is detected as a result of the processing, for example, the pressure processing unit 101C recognizes that "the robot 1 has been hit (rebuked)", and when longtime pressure with a value smaller than the predetermined threshold is detected, the pressure processing unit 101C recognizes that "the robot 1 has been stroked (praised)". Then, the pressure processing unit 101C notifies the model storage unit 102 and the behavior decision mechanism unit 103 of the recognition result as state recognition information.

The image recognition unit 101D performs image recognition processing using the image signal S1A supplied from the cameras 81L and 81R. Then, when a "red round subject", a "flat surface being vertical to the ground surface and having a predetermined height or more", or the like is detected as a result of the processing, for example, the image recognition unit 101D notifies the speech recognition unit 101A, the model storage unit 102, and the behavior decision mechanism unit 103 of an image recognition result indicating that "there is a ball", "there is a wall", human face has been detected, or the like, as state recognition information.

Here, when the speech recognition unit 101A receives an identification result of a user that is obtained by face recognition, from the image recognition unit 101D, the speech recognition unit 101A can determine a registration state ("voice of the user is insufficient", "voice of the user is sufficient", and the like) of speaker identification voice for an identified user as an internal state of a speaker identification result, and output the registration state. That is, even in a state in which a user does not pronounce voice, the speech recognition unit 101A transmits insufficiency of speaker identification voice of the user, to the behavior determination/decision mechanism unit 103. Note that the details of a method of determining a registration state of speaker identification voice for a user (in other words, whether speaker identification data of the user is sufficient or insufficient) will be described later.

The model storage unit 102 stores and manages models such as a feeling model, an instinct model, and a growth model that represent feeling, instinct, and a growth state of the legged robot 1.

Here, the feeling model includes a state (degree) of feeling such as "happiness", "sadness", "anger", and "fun", for example, and each state is represented by a value in a predetermined range (e.g., −1.0 to 1.0, etc.). The model storage unit 102 stores a value representing a state of each feeling, and changes the value on the basis of state recognition information from the state recognition information processing unit 101, lapse of time, and the like.

Furthermore, the instinct model includes a state (degree) of instinctive desire such as "appetite", "desire for sleep", "desire for exercise", for example, "and each state is represented by a value in a predetermined range. The model storage unit 102 stores a value representing a state of each desire, and changes the value on the basis of state recognition information from the state recognition information processing unit 101, lapse of time, and the like.

Furthermore, the growth model includes a state (degree) of growth such as "young stage", "young adulthood stage", "senior stage", "elder stage", for example, and each state is represented by a value in a predetermined range. The model storage unit 102 stores a value representing a state of each growth, and changes the value on the basis of state recognition information from the state recognition information processing unit 101, lapse of time, and the like.

In the above-described manner, the model storage unit 102 transmits feeling, instinct, and a growth state that are represented by values of the feeling model, the instinct model, and the growth model, to the behavior decision mechanism unit 103 as state information.

Note that, aside from state recognition information supplied from the state recognition information processing unit 101, behavior information indicating a current or past behavior of the robot 1, specifically, behavior information indicating the content of a behavior such as "walked for a long time", for example, is supplied to the model storage unit 102 from the behavior decision mechanism unit 103. Accordingly, even if the same state recognition information is supplied to the model storage unit 102 from the state recognition information processing unit 101, the model storage unit 102 generates different state information in accordance with a behavior of the robot 1 indicated by the behavior information.

In other words, for example, in a case where the robot 1 make a greeting to a user and the user strokes the head of the robot 1, behavior information indicating that the robot 1 has made a greeting to the user, and state recognition information indicating that the user has stroked the head of the robot 1 are supplied to the model storage unit 102, and in this case, in the model storage unit 102, a value of a feeling model representing "happiness" increases. On the other hand, in a case where a user strokes the head of the robot 1 while the robot 1 is executing a work of some sort, behavior information indicating that the robot 1 is executing a work, and state recognition information indicating that the user has stroked the head of the robot 1 are supplied to the model storage unit 102, and in this case, in the model storage unit 102, a value of a feeling model representing "happiness" is not changed.

In this manner, the model storage unit 102 sets a value of a feeling model referring not only to state recognition information but also to behavior information indicating a current or past behavior of the robot 1. Therefore, an unnatural change in feeling such as an increase in a value of a feeling model representing "happiness" when the user strokes the head of the robot 1 as a mischief while the robot 1 is executing a task of some sort, for example, can be prevented from being generated.

On the basis of a user identification result provided by the speech recognition unit 101A, the model storage unit 102 can hold the above-described feeling models for each user. Thus, a behavior that makes a certain user 1 "happy" when being executed to the user 1 is different from a behavior that makes a different user 2 "happy" when being executed to the user 2. Accordingly, by transmitting state information corresponding to a user identification result to the behavior decision mechanism unit 103, the model storage unit 102 can generate various behaviors corresponding to an individual user.

Note that the model storage unit 102 also increases and decreases values of an instinct model and a growth model on the basis of both state recognition information and behavior information similarly to the case of a feeling model. Furthermore, the model storage unit 102 also increases and decreases respective values of a feeling model, an instinct model, and a growth model on the basis of a value of another model.

The behavior decision mechanism unit 103 decides a next behavior of the legged robot 1 on the basis of state recognition information output from the state recognition information processing unit 101, state information output from the model storage unit 102, lapse of time, and the like. Here, in a case where content of a decided behavior does not require speech recognition processing or image recognition processing, like a behavior of "dancing", for example, the content of the behavior is transmitted to the posture transition mechanism unit 104 as behavior command information.

The behavior decision mechanism unit 103 manages, as a behavior model defining a behavior of the legged robot 1, a finite automaton in which a behavior that can be performed by the legged robot 1 is associated with a state. Then, the behavior decision mechanism unit 103 shifts a state in the finite automaton serving as a behavior model, on the basis of state recognition information from the state recognition information processing unit 101, a value of a feeling model, an instinct model, or a growth model in the model storage unit 102, lapse of time, and the like, and decides a behavior corresponding to a shifted state, as a behavior to be performed next.

For example, when the user speaks "let us play", a behavior is decided on the basis of state recognition information from the state recognition information processing unit 101, an output speech recognition result indicating "let us play", and a state of another model, and a behavior such as "chasing" or a "word chain game" can be output.

At this time, if a speaker identification result output simultaneously with state recognition information from the state recognition information processing unit 101 indicates a user 1 and an internal state of the speaker identification unit 101*b* is "voice information of the user 1 is insufficient", the behavior decision mechanism unit 103 outputs a behavior for collecting voice information of the user 1 such as "Hey, user 1, let us play a word chain game". As a result, the legged robot 1 can guide the user 1 in such a manner as to increase voice information of the user 1, while playing with the user 1.

Here, if the behavior decision mechanism unit 103 detects a predetermined trigger, the behavior decision mechanism unit 103 shifts a state. In other words, the behavior decision mechanism unit 103 shifts a state when an execution time of a behavior corresponding to a current state reaches a predetermined time, when specific state recognition information is received, when a value of feeling, instinct, or a growth state that is indicated by state information supplied from the model storage unit 102 becomes a predetermined threshold or less or a predetermined threshold or more, and the like, for example.

As described above, a registration state of speaker identification voice is output from the state recognition information processing unit 101 to the behavior decision mechanism unit 103 together with state recognition information. Specifically, the registration state of speaker identification voice includes information indicating whether speaker identification data of a user is sufficient or insufficient. Then, if information indicates that speaker identification data is insufficient for a user identified to exist in front, on the basis of a speaker identification result or a face recognition result, triggered by the information, the behavior decision mechanism unit 103 can output a behavior for collecting lacking speaker identification data such as autonomously saying "Let us play a word chain game!" from the legged robot 1 side.

Furthermore, as described above, the behavior decision mechanism unit 103 shifts a state in a behavior model on the basis not only of state recognition information from the state recognition information processing unit 101, but also of a value of a feeling model, an instinct model, or a growth model in the model storage unit 102, and the like. Accordingly, even if the same state recognition information is input to the behavior decision mechanism unit 103, depending on a value of a feeling model, an instinct model, or a growth model (state information), a state transition destination to be decided by the behavior decision mechanism unit 103 varies.

Furthermore, as described above, the behavior decision mechanism unit 103 also generates behavior command information for causing the legged robot 1 to speak, aside from behavior command information for operating the head, a limb, or the like of the legged robot 1. Behavior command information for causing the legged robot 1 to speak is supplied to the voice synthesis unit 105. Behavior command information supplied to the voice synthesis unit 105 includes text data corresponding to a synthetic tone to be generated by the voice synthesis unit 105, and the like. Then, if the voice synthesis unit 105 receives behavior command information from the behavior decision mechanism unit 103, the voice synthesis unit 105 generates a synthetic tone on the basis of text data included in the behavior command information, supplies the synthetic tone to the speaker 72, and causes the speaker 72 to output the synthetic tone.

Furthermore, the behavior decision mechanism unit 103 displays, on the display unit 55 as a prompt, a text of a word corresponding to speech or substituting speech in a case where or speech is not performed. For example, when voice is detected and the robot 1 turns around, a text such as "Who is it?" or "What?" can be displayed on the display unit 55 as a prompt or can be generated by the speaker 72.

Figure 8:
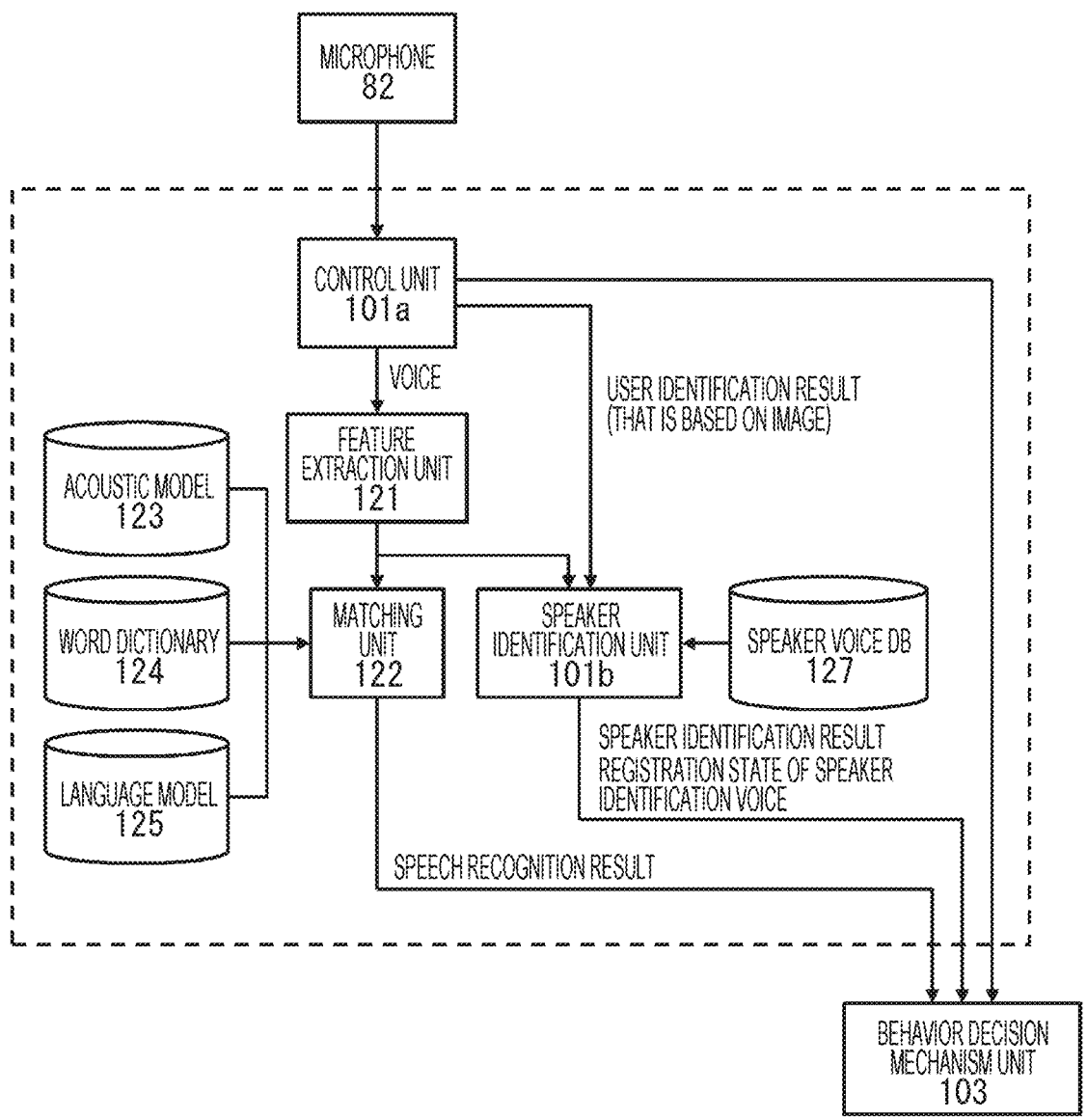
FIG. 8 is a block diagram illustrating a functional configuration of a speech recognition unit 101A.

FIG. 8 illustrates the details of the functional configuration of the speech recognition unit 101A in the state recognition information processing unit 101.

If the control unit 101*a* detects a signal indicating that a voice signal is detected, the control unit 101*a* outputs the signal indicating that a voice signal is detected, to the behavior decision mechanism unit 103.

Furthermore, the control unit 101*a* outputs a voice signal input from the microphone 82 and converted into a digital signal by an AD converter (not illustrated), to a feature extraction unit 121.

The feature extraction unit 121 calculates a feature amount of an input voice signal. A matching unit 122 decides a word string corresponding to a feature of input voice using an acoustic model 123, a word dictionary 124, and a language model 125, and outputs the word string to the behavior decision mechanism unit 103 as a speech recognition result.

The acoustic model 123 stores an acoustic model representing an acoustic feature such as each phoneme and syllable in a language of voice to be subjected to speech recognition. For example, a hidden Markov model (HMM) or a neural network is used as an acoustic model. The word dictionary 124 stores a word dictionary in which information (phonological information) regarding pronunciation of each word (vocabulary) to be recognized is described. The language model 125 stores a grammar rule describing how words registered in the word dictionary 124 are concatenated. As a grammar rule, for example, description that is based on a context-free grammer (CFG), a statistical word concatenation probability (N-gram), a neural network language model, or the like is used.

The feature extraction unit 121 outputs a speech feature also to the speaker identification unit 101*b*. If a voice signal is input, the speaker identification unit 101*b* identifies a speaker corresponding to voice, referring to a speaker voice database 127, and outputs a speaker identification result to the behavior decision mechanism unit 103. The speaker voice database 127 registers voice data of one or more users to be subjected to speaker identification. The speaker identification unit 101*b* also determines a registration state of speaker identification voice in the speaker voice database 127, and also outputs the registration state to the behavior decision mechanism unit 103 together with a speaker identification result. For example, the speaker identification unit 101*b* outputs a binary condition of a speaker identification result indicating that voice data of "the user 1" is "insufficient" or "sufficient", as a registration state of the speaker voice database 127.

The control unit 101*a* also receives a user identification result of the image recognition unit 101D as an input, and transmits the result to a speaker identification unit 126. In a case where a user identification result that is based on image recognition processing is input, the speaker identification unit 101*b* does not perform speaker identification, but outputs a registration state of speaker identification voice in the speaker voice database 127 (in other words, binary condition indicating "insufficient" or "sufficient").

Here, several methods for determining a registration state of speaker identification voice in the speaker voice database 127 in the speaker identification unit 10*b* will be introduced.

As the first determination method, there is a method of determining a registration state on the basis of a data amount of speaker identification (the length of voice data), and an expiration period that is based on acquisition date and time of data. Data of a user having a data amount within an expiration period that falls below a reference value is determined to be "insufficient". For example, it is assumed that a state of voice data of each user registered in the speaker voice database 127 is as indicated by the following table 1.

TABLE 1

| Data ID | Acquisition date and time | User ID | Data amount (second) |
|---|---|---|---|
| D0001 | 2017 Oct. 16 13:00 | U001 | 8.0 |
| D0002 | 2017 Dec. 25 9:00 | U001 | 2.2 |
| D0003 | 2018 Jan. 15 14:52 | U001 | 1.1 |
| D0004 | 2017 Dec. 1 8:00 | U002 | 3.2 |
| D0005 | 2018 Jan. 10 15:00 | U002 | 4.2 |

The above-described table 1 indicates states of speaker identification voice data D0001 to D0005. Here, a necessary amount of voice data of speaker identification is set to five seconds or more, and an expiration period of speaker identification data is set to three months.

If the current date and time is 2018/1/15 15:00, voice data of a user U001 that has been registered from an expiration date 2017/10/15 15:00 to the current time is 11.3 seconds in total, and voice data of a user U002 is 7.4 seconds. Because registered voice within an expiration period of each of the users U001 and U002 is equal to or larger than a necessary amount of five seconds, voice data of these users are determined to be "sufficient".

On the other hand, if the current date and time is 2018/1/17 15:00, voice with a data ID D0001 gets out of an expiration period. Accordingly, voice of the user U001 that has been registered within an expiration period becomes 3.3 seconds, which falls below a necessary amount of five seconds. Thus, voice data of the user U001 is determined to be "insufficient".

Furthermore, as the second determination method, there is a method of determining a registration state using pronunciation information of voice together with a data amount of speaker identification (the length of voice data), and an expiration period of data. According to this method, it is possible to finely determine, for each user, what type of voice (phonological voice) is lacking. For example, it is assumed that a state of voice data of each user registered in the speaker voice database 127 is as indicated by the following table 2.

TABLE 2

| Data ID | Acquisition date and time | User ID | Data amount (second) | Pronunciation |
|---|---|---|---|---|
| D0001 | 2017 Oct. 16 13:00 | U001 | 8.0 | "a-o-i" |
| D0002 | 2017 Dec. 25 9:00 | U001 | 2.2 | "i-e" |
| D0003 | 2018 Jan. 15 14:52 | U001 | 1.1 | "i-u" |
| D0004 | 2017 Dec. 1 8:00 | U002 | 3.2 | "a-i-u-e-o" |
| D0005 | 2018 Jan. 10 15:00 | U002 | 4.2 | "a-o" |

The above-described table 2 indicates states of speaker identification voice data D0001 to D0005. Pronunciation is allocated to the speech of the user for each phonological voice. Nevertheless, for simplifying the description, here, voice to be registered for speaker identification is assumed to only include five phonological voices of "a", "i", "u", "e", and "o". Then, a necessary amount of speaker identification data is set to once or more for each phonological voice, and an expiration period of speaker identification data is set to three months.

If the current date and time is 2018/1/15 15:00, voice data of the user U001 that has been registered from an expiration date 2017/10/15 15:00 to the current time includes "a" once, "i" twice, "u" once, "e" once, and "o" once. Furthermore, voice data of the user U002 within an expiration period includes "a" twice, "i" once, "u" once, "e" once, and "o" twice. Because all phonological voices in registered voice within an expiration period of each of the users U001 and U002 are pronounced once or more, which is a necessary amount, voice data of these users are determined to be "sufficient".

On the other hand, if the current date and time is 2018/1/17 15:00, voice with a data ID D0001 gets out of an expiration period. Accordingly, voice of the user U001 within an expiration period only includes "i" three times, "u" once, and "e" once, and does not include voices "a" and "o". Thus, voice data of the user U001 is determined to be insufficient. Moreover, it can be seen that voice data of the user U001 lacks phonological voices "a" and "o".

At this time, because information regarding lacking phonological voices is also input, in addition to collecting voice data by simply promoting the user U001 to speak, the behavior decision mechanism unit 103 can actively (or with a high rate) select a behavior of collecting voice data including lacking phonological voices (voices "a" and "o" in the example indicated in Table 2). For example, if the robot 1 performs a word chain game with the user U001, the robot side provides "i-n-to-ri-a (meaning "interior")" for surely obtaining the voice "a", or the robot side provides "e-ga-o (meaning "smile")" for surely obtaining the voice "o".

According to the second determination method, pronunciation of voice is held for each phonological voice, and each lacking phonological voice is obtained, but similar processing can be performed with various granularities. For example, similar processing can be performed for each phoneme (/a/,/i/,/p/,/k/, and the like), which is finer than phonological voice, or for each phonological voice string (a-o, a-i, a-u, a-ka, and the like) or for each phoneme string (a-k-a, k-a-i and the like), which is larger than phonological voice in contrast, for example.

Note that in the description of the above-described two determination methods, because speech recognition is used as an example, the length of voice data becomes an amount of user identification data. In contrast to this, in the case of performing face identification, the number of images acquired for each orientation of a face such as a full face, a right-oriented face, a left-oriented face, an up-oriented face, and a down-oriented face corresponds to an amount of user identification data. Accordingly, the orientation of a face of each user and collected date and time thereof are registered in a database, and a registration state indicating that the number of images of an up-oriented face is small, for example, can be determined. Then, when a registration state indicating that the number of images of an up-oriented face is small is input, the behavior decision mechanism unit 103 selects a behavior of provoking the user to face upward (e.g., the legged robot 1 asks "What color is the today's sky?", the legged robot 1 further moves to the feet of the user, and increases the chance of the user facing relatively upward), in such a manner as to make it easier to acquire an up-oriented of the user.

Furthermore, as the third determination method, instead of determining a registration state on the basis of freshness and an amount of sample data as in the above-described two determination methods, a score in checking speaker identification, a value obtained by further normalizing a checking score, and the like can be used. The checking score is a value indicating a similarity between data input for identification and registered sample data.

For example, when it is identified, using face identification, that a user existing in front is the user U001, if a checking score of speaker identification of voice of the user is low, it can be determined that voice data of the user U001 is old or insufficient. In such a case, by actively (or with a high rate) selecting a behavior such as "getting closer" to the user U001, "playing a word chain game", or "singing a song together", the behavior decision mechanism unit 103 can collect voice of the user U001.

Alternatively, when it is identified, using speaker identification, that a speaker is the user U001, if a checking score of face identification of the user is low, it can be determined that data of face images of the user is old or insufficient. In such a case, by actively (or with a high rate) selecting a behavior such as "getting closer" to the user U001, or "wandering around" the user U001, the behavior decision mechanism unit 103 can capture images of faces such as a full face, a right-oriented face, and a left-oriented face of the user U001.

Figure 9:
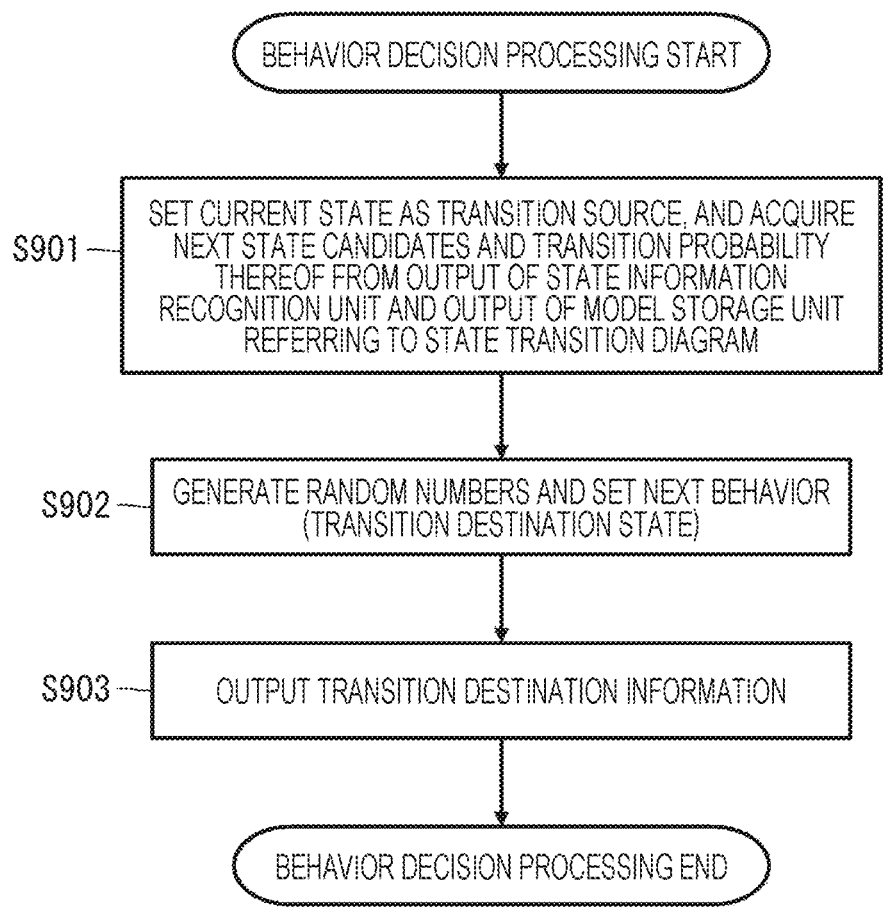
FIG. 9 is a flowchart illustrating a processing procedure for a behavior decision mechanism unit 103 deciding a next behavior of the legged robot 1.

FIG. 9 illustrate, in a form of a flowchart, a processing procedure for the behavior decision mechanism unit 103 deciding a next behavior of the legged robot 1.

First of all, the behavior decision mechanism unit 103 sets the current state as a transition source, and acquires next state candidates of the legged robot 1 and a transition probability to each state candidate from a registration state for a user identified by speaker identification (or face identification) that is output from the state information recognition processing unit 101, and state information of the user that is output from the model storage unit 102, referring to a state transition diagram of a finite automaton or the like (Step S901).

Then, the behavior decision mechanism unit 103 generates random numbers, and decides a next behavior of the legged robot 1 by selecting a state candidate of any transition destination in accordance with the transition probability (Step S902), and outputs information regarding a transition destination state to the posture transition mechanism unit 104 or the voice synthesis unit 105 (Step S903).

Figure 10:
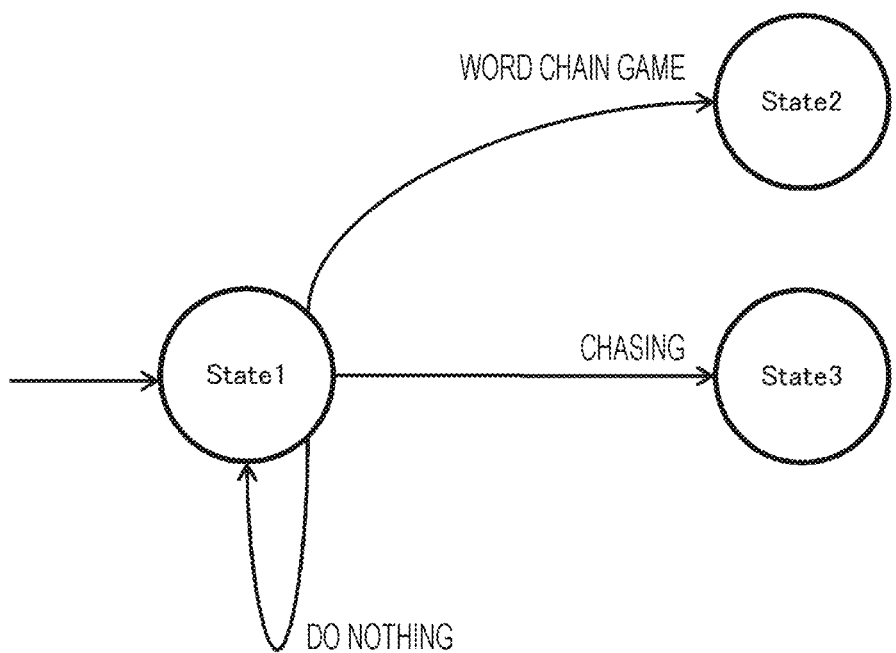
FIG. 10 is a diagram illustrating an example of a state transition diagram of the legged robot 1.

FIG. 10 illustrates an example of a state transition diagram of the legged robot 1 that is to be used by the behavior decision mechanism unit 103 for deciding a next behavior of the legged robot 1 in Step S901 in the flowchart illustrated in FIG. 9. Here, an upper part in the drawing illustrates graphical description of a part of the state transition diagram, and a lower part in the drawing illustrates a description example as a state transition table.

The state transition diagram illustrated in FIG. 10 is assumed to be prepared for a certain specific user identified by the speaker identification unit 101b. Alternatively, the behavior decision mechanism unit 103 may perform behavior decision using the same state transition diagram for all user, without preparing a state transition diagram for each user. Furthermore, the behavior decision mechanism unit 103 also acquires, from the speaker identification unit 101b, information regarding a registration state of speaker identification voice of the identified user, together with an identification result of the user (as described above).

When the current state is State 1, the next behavior is any of a "word chain game" being a transition to State 2, "chasing" being a transition to State 3, and "do nothing" being a return to State 1. An input command obtained by the state information recognition processing unit 101 (the speech recognition unit 101A) is "let us play".

Referring to the state transition table provided in the lower part of FIG. 10, when a registration state of speaker identification voice is "sufficient", probabilities at which the legged robot 1 performs the above-described three behaviors "word chain game", "chasing", and "do nothing" are 0.2, 0.3, and 0.5, respectively. That is, the legged robot 1 does nothing at the probability of 50%, but if the legged robot 1 performs a behavior, there is a high possibility that chasing is executed.

On the other hand, even in a case where the state is State1 and an input command is "let us play" in the same manner, when registration state of speaker identification voice is "insufficient", probabilities at which the legged robot 1 performs the above-described three behaviors "word chain game", "chasing", and "do nothing" are 0.9, 0.0, and 0.1, respectively, and the legged robot 1 plays a word chain game at an extremely high probability. This can be said to be an example of a state transition aimed at acquiring a large amount of voice of a speaker by executing a word chain game with the user.

In the state transition diagram exemplified in FIG. 10, information output from the model storage unit 102 such as a growth model or a feeling model is not used. It should be appreciated that outputs of these models can be added to a condition of a state transition. Furthermore, the above-described trigger information or the like can also be used for a state transition.

By the behavior decision mechanism unit 103 deciding a behavior of the legged robot 1 on the basis of an output from the state recognition information processing unit 101 as described above, the legged robot 1 can implement a behavior on the basis not only of an input from the outside or an internal model, but also of an internal state of identification processing such as recognition processing.

In the above-described embodiment, the description has been given of an example of deciding a behavior of the legged robot 1 in a case where a binary condition indicating that voice data for speaker identification is "insufficient" or "sufficient" is output as a speaker identification result. In contrast to this, in the case of performing user identification on the basis of image recognition, a state in which voice data of a user identified by face identification "does not exist" can be generated. In a case where voice data of a user "does not exist", the behavior decision mechanism unit 103 can output a behavior for acquiring voice data of the user, further actively (or with a higher rate) more than in a case where the voice data is "insufficient".

In the above-described embodiment, the behavior decision mechanism unit 103 decides a behavior of the legged robot 1 on the basis of a registration state of speaker identification voice, but the behavior decision mechanism unit 103 can also decide a behavior of the legged robot 1 on the basis of a registration state of a face image for face identification. For example, in a case where a face of the user has been detected, but a right-oriented face is lacking, the behavior decision mechanism unit 103 may output a behavior that can collect a large amount of information regarding the orientation of the face of the user, such as a "look this way game".

Furthermore, in the above-described embodiment, the behavior decision mechanism unit 103 decides a behavior like a game such as a "word chain game" or a "look this way game" on the basis of a registration state of speaker identification voice or a face image for face identification, but the behavior decision mechanism unit 103 can also decide a behavior of the legged robot 1 further considering identification certainty of each identification device of voice, a face, or the like, and may decide a behavior other than a game. For example, when the certainty of face identification of the user is low, the behavior decision mechanism unit 103 can increase the decision of a behavior not requiring a response from the user and involving little element of a game (or not involving such an element at all), such as simply coming closer to the user.

Furthermore, FIG. 10 illustrates an example of deciding the next behavior of the legged robot 1 on the basis of a binary condition indicating that data for user identification is "insufficient" or "sufficient", but not only a data amount but also the freshness of data can be added to the evaluation. For example, even if an amount of voice data of a certain user that is registered for user identification is sufficient, when the data becomes old, the behavior decision mechanism unit 103 can actively (or with a high rate) decide a behavior that can collect voice of the user. If old data is regarded as unusable, in a case where only old data is accumulated for a certain user, it is eventually determined that data is insufficient in the same manner.

Furthermore, even if an amount of voice data registered for a certain user is sufficient, data of specific pronunciation (phonological voice) might be lacking in some cases. For example, in a case where voice data starting with "pa" is lacking, when playing a "word chain game" with the user, by deciding a behavior of pronouncing a word ending with "pa" such as "co-n-pa (meaning party)", "yoh-ro-ppa (meaning Europe)" or "ka-n-pa (meaning chip)", the behavior decision mechanism unit 103 can collect voice data useful for speaker identification more efficiently.

Furthermore, in the above-described embodiment, a behavior of the legged robot 1 is decided while paying attention only to information provided from a user such as voice or a face of the user, but a behavior of the legged robot 1 can also be decided considering sufficiency or insufficiency of information provided from a provision source other than the user, such as environmental information, for example. For example, when indoor face information of a certain user is sufficient but outdoor face information is insufficient, the behavior decision mechanism unit 103 can make it easier to acquire outdoor face information, by bringing the user out by saying "let us take a walk" or the like.

Furthermore, in the above-described embodiment, the behavior decision mechanism unit 103 finds a user by speaker identification, face identification, or the like, and then, decides a behavior for collecting data necessary for user identification, but the behavior decision mechanism unit 103 can also decide the behavior even before finding a user.

For example, a case where speaker identification data corresponding to N persons including the users 1 to N are stored in the speaker voice database 127, and the speaker identification unit 101b implements speaker identification of each of the users 1 to N on the basis of these pieces of information is assumed. Here, when the speaker identification unit 101b checks the speaker voice database 127 and detects that voice data for identifying the user 1 as a speaker is insufficient, even before finding the user 1 (in other words, without involving a speaker identification result of the user 1), the speaker identification unit 101b outputs a registration state indicating that voice data of the user 1 is insufficient. Then, the behavior decision mechanism unit 103 actively (or with a high rate) selects a behavior of searching for the user 1 in response to the output, and makes it easier to collect voice data of the user 1. Moreover, when the user 1 has been found, the behavior decision mechanism unit 103 actively (or with a high rate) selects a behavior that makes it easier to collect voice data of the user, such as saying "let us talk" from the legged robot 1 side.

Furthermore, in the above-described embodiment, the legged robot 1 is configured to identify a user using two types of identification devices respectively for speaker identification and face identification, but a method of identifying a user is not limited to these two methods. For example, it is possible to identify a user on the basis of various types of data provided from a user, such as a biological signal or an iris. Furthermore, in a case where the legged robot 1 uses a third identification device other than speaker identification and face identification, when data for the third identification device identifying a user is insufficient, the behavior decision mechanism unit 103 can actively (or with a high rate) select a behavior for making it easier to collect data for the third identification device, in a similar manner.

For example, in a case where a biological signal of heart rate or the like that is to be used by the third identification device is insufficient, the behavior decision mechanism unit 103 promotes a user whose biological signal is insufficient, to make contact, and actively (or with a high rate) selects a behavior for making it easier to acquire biological information such as heart rate or aspiration. Specifically, the behavior decision mechanism unit 103 promotes the user to make contact with the legged robot 1 by saying "let us talk" from the legged robot 1 side. Furthermore, in a case where iris information to be used by the third identification device is insufficient, the behavior decision mechanism unit 103 actively (or with a high rate) selects a behavior for making it easier to acquire iris information, by saying "look at my eyes", "let us play a staring game", or the like to the user, for example. In this manner, the legged robot 1 can acquire various types of data provided from the user, without making the user feel burdensome feeling.

Furthermore, in the above-described embodiment, one legged robot independently collects data for an identification device identifying a user, but it should be appreciated that two or more legged robots may perform data collection in cooperation.

For example, a legged robot A detects that voice data for identifying the user 1 as a speaker or face image data for performing face identification is insufficient, and implements a behavior of searching for the user 1, but cannot find the user 1. In such a case, the legged robot A transmits a search request of the user 1 to other legged robots B and C that are in partnership with the legged robot A.

The search request may include information regarding insufficient data of the user 1 (e.g., information indicating lacking phonological voice, information indicating that a left-oriented face is absent, and the like). Furthermore, the search request may include information for identifying the user 1 in the legged robots B and C, which are request destinations (e.g., voice data and face images of the user 1 that have been already registered in the legged robot A being a request source, other feature information of the user 1, and the like).

For example, it is assumed that the legged robot B being a request destination has found the user 1 requested by the legged robot A. The legged robot B may implement a behavior for acquiring data of the user 1 that is insufficient in the legged robot A, on behalf of the legged robot A, and return data of the user 1 (voice data, face images, or the like) that have been acquired through the behavior, to the legged robot A being a request source. Alternatively, the legged robot B may notify the legged robot A being a request source of a location where the user 1 has been found. In this case, the legged robot A can go to the place for itself and implement a behavior for acquiring insufficient data from the user 1.

Second Embodiment

A user itself has a variation such as an unexpected change in a short time and a change over a long time. There is concern that data registered for identification of voice, a face, or the like of a user becomes unusable in accordance with a variation generated in the user, and this leads to a decline in identification performance. In view of the foregoing, hereinafter, the description will be given of an embodiment in which the legged robot 1 selects a behavior for acquiring data for user identification in such a manner as to cover a variation generated in the user.

For example, in a case where performance of speaker identification changes depending on voice timbre of a user, by saying "speak in sad voice" or "speak in bright voice" to the user from the legged robot 1 side, voice data of various voice timbres can be newly collected from the same user, and the collected voice data can help in improving performance of speaker identification.

Furthermore, in a case where performance of face identification changes depending on facial expression of the user, by saying "let us play a staring game" or "give me a smile" to the user from the legged robot 1 side, face image data of various facial expressions of the same user can be newly collected, and the collected voice data can help in improving performance of face identification.

A case where performance of user identification suddenly declines due to a temporary change in feature of a user or the like can be considered. For example, when the user gets hoarse due to cold or excessive use of the voice, performance of speaker identification suddenly declines. Furthermore, when a face of the user gets injured or when a sticky patch is attached to a feature portion of the face, performance of face identification suddenly declines. In the above-described first embodiment, voice data and face images that are attributed to such a temporary change are added to voice data of the user and learning data of face image models that have been accumulated so far. As a result, identification performance recovers in response to a temporary change of the user, but when a temporary change disappears, there is concern that, if anything, identification performance declines due to newly-added learning data.

In view of the foregoing, in the second embodiment, when identification performance of a user declines, the legged robot 1 (or the behavior decision mechanism unit 103) identifies a decline cause thereof through a dialog with the user or the like, and controls the handling of data for user identification that is added along with a decline in identification performance, in accordance with the decline cause.

Figure 11:
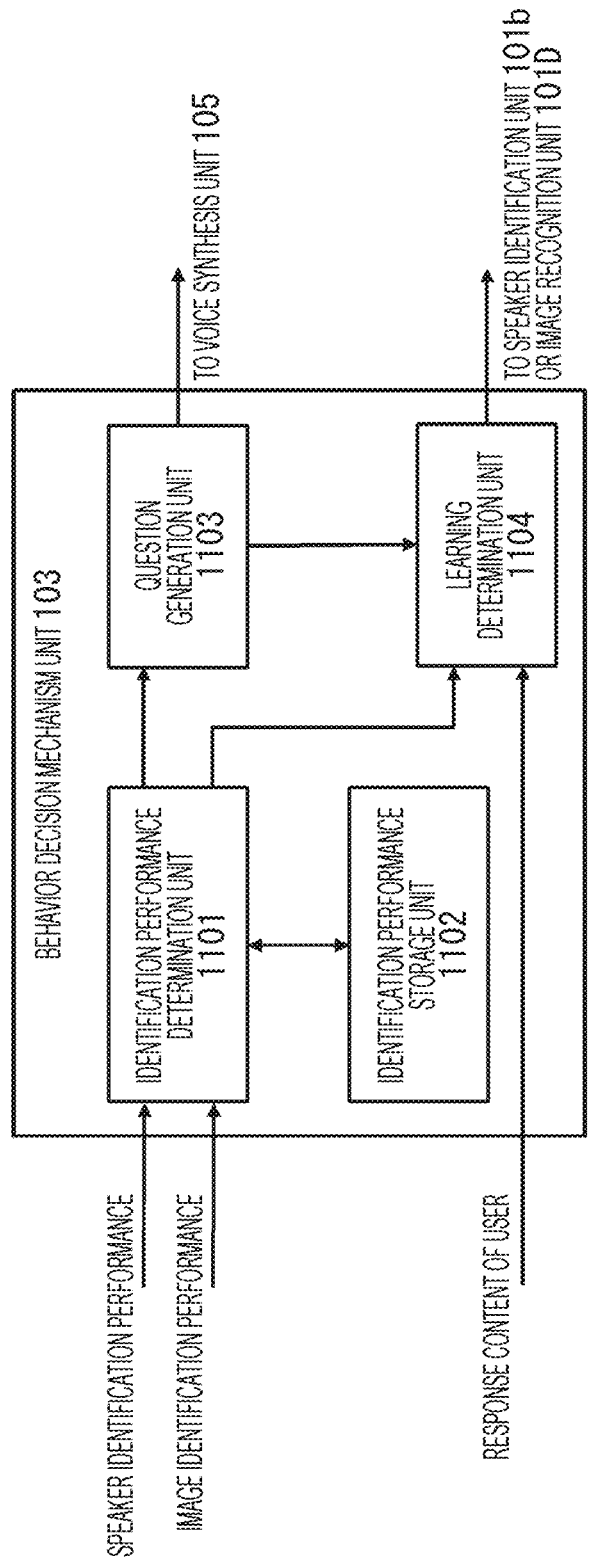
FIG. 11 is a block diagram illustrating a functional configuration of a behavior decision mechanism unit 103 configured to control handling of added data for user identification, in accordance with a decline cause of identification performance.

FIG. 11 illustrates a functional configuration of a behavior decision mechanism unit 103 configured to control handling of added data for user identification, in accordance with a decline cause of identification performance according to the second embodiment.

The behavior decision mechanism unit 103 illustrated in the drawing includes an identification performance determination unit 1101, an identification performance storage unit 1102, a question generation unit 1103, and a learning determination unit 1104.

The identification performance determination unit 1101 determines speaker identification performance in the speech recognition unit 101A (or the speaker identification unit 101*b*) or face identification performance in the image recognition unit 101D. Furthermore, the identification performance storage unit 1102 stores determination results of speaker identification performance and face identification performance that are obtained by the identification performance determination unit 1101, for a constant time.

Then, the identification performance determination unit 1101 determines whether or not identification performance rapidly declines, by comparing latest speaker identification performance and face identification performance input to the identification performance determination unit 1101, with speaker identification performance and face identification performance that have been obtained before a constant time and stored in the identification performance storage unit 1102. For example, the identification performance determination unit 1101 checks whether or not there is a rapid performance decline, by checking how current identification performance has changed as compared with a user identification result obtained in the last 24 hours, against data of the user identification performance storage unit 1102. The identification performance determination unit 1101 outputs a determination result to the question generation unit 1103 and the learning determination unit 1104.

When it is identified that at least either identification performance of speaker identification performance or face identification performance rapidly declines, the question generation unit 1103 generates a question sentence for identifying a decline cause thereof through a dialog with the user or the like. The generated question sentence is output to the voice synthesis unit 105. The voice synthesis unit 105 synthesizes voices of a question sentence, and outputs the voice from the speaker 72.

Voices returned by the user in response to the question sentence is collected by the microphones 82-1 to 82-N and subjected to speech recognition performed by the speech recognition unit 101A, and the recognition result is supplied to the learning determination unit 1104.

The learning determination unit 1104 analyzes content of the response to the question sentence from the user, and identifies a cause for a rapid decline of speaker identification performance or face identification performance. Then, the learning determination unit 1104 determines handling of data for user identification that is added along with a decline in identification performance, on the basis of the decline cause of identification performance, and outputs a determination result to the speaker identification unit 101b and the image recognition unit 101D.

In a case where the learning determination unit 1104 determines that a decline cause of identification performance is attributed to a temporary change, the speaker identification unit 101b and the image recognition unit 101D store voice data and face image data of the user that have been collected along with a decline in identification performance, not as normal learning data but as temporary learning data in a separated manner.

While a temporary change is continued, the speaker identification unit 101b and the image recognition unit 101D can recover identification performance by performing user identification using temporary learning data. Furthermore, when a temporary change disappears, the speaker identification unit 101b and the image recognition unit 101D can keep identification performance at a high level by performing user identification using normal learning data without using temporary learning data.

Figure 12:
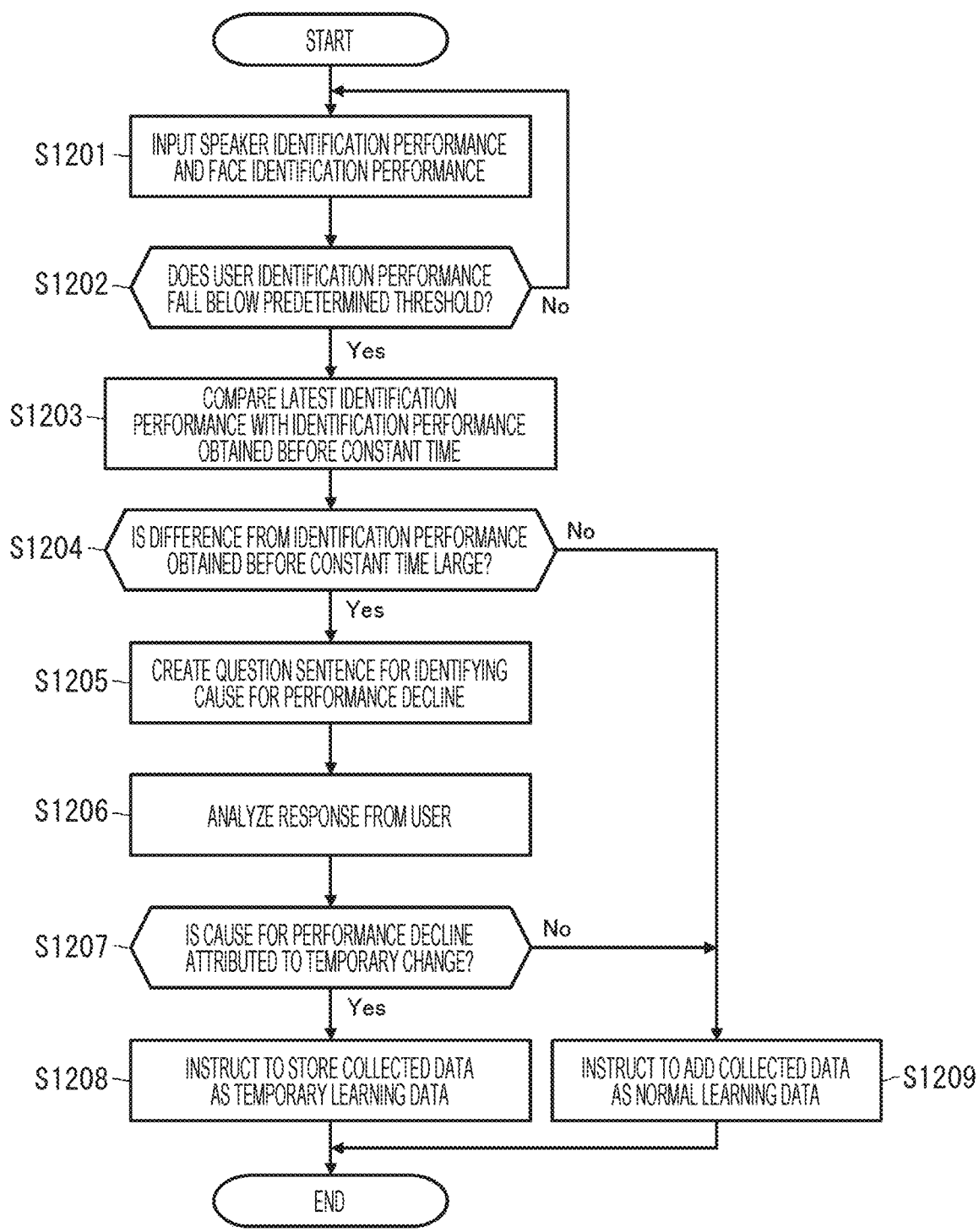
FIG. 12 is a flowchart illustrating a processing procedure for performing handling of added data for user identification in accordance with a decline cause of identification performance.

FIG. 12 illustrates, in a form of a flowchart, a processing procedure for performing handling of added data for user identification in accordance with a decline cause of identification performance, which is executed by the behavior decision mechanism unit 103 illustrated in FIG. 11.

The identification performance determination unit 1101 inputs speaker identification performance in the speech recognition unit 101A (or the speaker identification unit 101b) and face identification performance in the image recognition unit 101D (Step S1201), and checks whether or not these user identification performances fall below a predetermined threshold (Step S1202).

When a user identification performance falls below a predetermined threshold (Yes in Step S1202), it can be determined that new data collection from the user is necessary for recovering the user identification performance.

Subsequently, the identification performance determination unit 1101 compares latest speaker identification performance and face identification performance with speaker identification performance and face identification performance that have been obtained before a constant time and stored in the identification performance storage unit 1102 (Step S1203), and checks whether or not a change in user identification performance is large.

Here, when a difference between latest speaker identification performance and face identification performance, and speaker identification performance and face identification performance that have been obtained before a constant time is not large (No in Step S1204), that is to say, when there is no rapid decline in identification performance, the difference is considered to be attributed to a normal change over time in voice data and face data of the user. Accordingly, the learning determination unit 1104 outputs an instruction to the speaker identification unit 101b and the image recognition unit 101D so as to add voice data and face image data of the user that have been newly collected along with a decline in identification performance, as normal learning data (Step S1209), and ends the processing.

On the other hand, when a difference between latest speaker identification performance and face identification performance, and speaker identification performance and face identification performance that have been obtained before a constant time is large (Yes in Step S1204), that is to say, when identification performance rapidly declines, processing for identifying a cause for a rapid decline in identification performance is started.

In other words, the question generation unit 1103 generates a question sentence for identifying a decline cause thereof through a dialog with the user or the like (Step S1205). The generated question sentence is output to the voice synthesis unit 105. The voice synthesis unit 105 synthesizes voices of a question sentence, and outputs the voice from the speaker 72. Voices returned by the user in response to the question sentence is collected by the microphones 82-1 to 82-N and subjected to speech recognition performed by the speech recognition unit 101A, and the recognition result is supplied to the learning determination unit 1104. Then, the learning determination unit 1104 analyzes content of the response to the question sentence from the user (Step S1206), and identifies a cause for a rapid decline in speaker identification performance or face identification performance.

In a case where the learning determination unit 1104 determines that a decline cause of identification performance is attributed to a temporary change (Yes in Step S1207), the learning determination unit 1104 instructs the speaker identification unit 101b and the image recognition unit 101D to store voice data and face image data of the user that have been newly collected along with a decline in identification performance, as temporary learning data in a separated manner in a separated manner, without adding as normal learning data (Step S1208).

While a temporary change is continued, the speaker identification unit 101b and the image recognition unit 101D can recover identification performance by performing user identification using newly-collected data. Furthermore, when a temporary change disappears, the speaker identification unit 101b and the image recognition unit 101D can keep identification performance at a high level by performing user identification using normal learning data without using data newly collected along with a rapid decline in identification performance. When a temporary change disappears, each identification device may discard data newly collected along with a rapid decline in identification performance.

Furthermore, in a case where the learning determination unit 1104 determines that a decline cause of identification performance is not attributed to a temporary change, that is to say, determines that a decline cause is attributed to a normal change over time in voice data and face data of the user (No in Step S1207), the learning determination unit 1104 outputs an instruction to the speaker identification unit 101b and the image recognition unit 101D so as to add voice data and face image data of the user that have been collected along with a decline in identification performance, as normal learning data (Step S1209), and ends the processing.

For example, a case where speaker identification performance of a user (named "A") in the speaker identification unit 101b rapidly declines as compared with that in the previous day is assumed. In this case, for identifying a cause for the performance decline, the behavior decision mechanism unit 103 generates a question "Hey A, your voice seems to have changed from the previous day. Are you OK?", and outputs the question by voice through the voice synthesis unit 105 and the speaker 72.

If a response to this question from A includes negative content such as "Really? There is no particular change", the learning determination unit 1104 in the behavior decision mechanism unit 103 determines that the rapid decline in speaker identification performance is not attributed to a temporary change in the user (named "A"), and adds voice data newly collected from A being triggered by a decline in speaker identification performance, to the speaker voice database 127 as normal learning data.

However, if a response to the above-described question from A includes content indicating that the rapid decline is attributed to a temporary change, such as "I might have caught a touch of cold" or "I drank too much yesterday", the learning determination unit 1104 in the behavior decision mechanism unit 103 determines that the rapid decline in speaker identification performance is attributed to a temporary change in the user (named "A"). In this case, voice data newly collected from A being triggered by a decline in speaker identification performance is learned not as normal learning data but as "temporary voice data of A" separately from existing (normal) voice data of A.

By learning a lasting feature of voice of A separately from a feature of voice of A that is caused by a temporary change, it is possible to enhance identification performance of voice of A that has been temporarily changed, and prevent an identification performance decline to be caused when voice of A returns to the original voice.

In the above description, collected data is separately learned while dividing the collected data into two types including normal (existing) learning data and temporary learning data. A temporary change in feature of the user does not always immediately return to the original feature, and a case where the temporary change is continued for a while is also assumed. For example, in the case of identifying a user by image recognition, hairstyle or the like of the user suddenly changes on a certain day, but the hairstyle does not change for some time.

Accordingly, there can also be considered a third learning method of replacing collected data with newly-collected data by discarding data accumulated so far, aside from normal (existing) learning data and temporary learning data. In this case, the question generation unit 1103 in the behavior decision mechanism unit 103 needs to generate a question sentence for further identifying whether or not a decline cause of identification performance is a temporary change and the temporary change continues for a while.

For example, a case where performance of face recognition declines due to a drastic change in hairstyle of the user is assumed. In the behavior decision mechanism unit 103, the question generation unit 1103 generates a question sentence "Have you changed hairstyle?", and the generated question is subjected to voice synthesis and voice output. In a case where a response "Yes" is received from the user in response to the question, the behavior decision mechanism unit 103 selects a behavior of speaking "Look nice! Let me see more!", and further selects a behavior of making it easier to collect image data of the user with the changed hairstyle. Furthermore, the learning determination unit 1104 in the behavior decision mechanism unit 103 instructs the image recognition unit 101D to discard data accumulated for the user, and replace the old data with newly-collected image data. Note that a method of leaving 10 percent of accumulated data and replacing 90 percent with new data, without discarding all data accumulated so far may be used.

As described heretofore, the legged robot 1 includes an identification device of a user, and can autonomously output a behavior. By further applying the technology disclosed in this specification, the legged robot 1 can passively or actively decide a behavior in accordance with the identification device's identification performance of the user. In other words, in a case where an amount of data to be used by the identification device for user identification is insufficient, the legged robot 1 can actively (or with a high rate) output a behavior that makes it easier to collect data to be used by the identification device for user identification. Accordingly, it is possible to efficiently collect information from a user and keep performance of the identification device at a high level, in a state in which burdensome feeling felt by the user is small. Furthermore, by the legged robot 1 accurately identifying a user, it is possible to provide a service suitable for an individual user.

INDUSTRIAL APPLICABILITY

Heretofore, the technology disclosed in this specification has been described in detail with reference to a specific embodiment. However, it is obvious that the one skilled in the art can modify or substitute the embodiment without departing from the scope of the technology disclosed in this specification.

In this specification, an embodiment related to a legged robot has been mainly described, but the applicable scope of the technology disclosed in this specification is not limited to this. The technology disclosed in this specification can be similarly applied to various types of autonomous behavior apparatuses autonomously behaving for each user, such as a mobile robot other than a legged robot, an immobile dialog robot, and a voice agent.

In short, the technology disclosed in this specification has been exemplarily described, and content described in this specification is not to be construed in a limited way. For determining the scope of the technology disclosed in this specification, the appended claims are to be referred to.

Note that the technology disclosed in this specification can employ the following configurations.

(1) An information processing apparatus for performing processing related to a device configured to autonomously behave to an object identified by an identification device, the information processing apparatus including:
   an acquisition unit configured to acquire a state of the identification device; and
   a decision unit configured to decide a behavior of the device on the basis of the state.

(1-1) The information processing apparatus according to (1) described above,
   in which the identification device identifies a user as an object, and
   the decision unit decides a behavior to a user identified by the identification device.

(1-2) The information processing apparatus according to (1-1) described above,
   in which the identification device identifies a user on the basis of a detection signal obtained by a sensor included in the device.

(1-3) The information processing apparatus according to (1) described above, further including the identification device.

(1-4) The information processing apparatus according to (1) described above, further including the device.

(1-5) The information processing apparatus according to (1-4) described above,
   in which the device is a robot apparatus including a moving means.

(2) The information processing apparatus according to (1) described above, in which the acquisition unit acquires identification performance of the identification device for an object, and
the decision unit decides a behavior of the device for resolving a cause for which the identification performance is low.

(3) The information processing apparatus according to any of (1) or (2) described above,
in which the acquisition unit acquires a state of data to be used by the identification device for identification of an object, and
the decision unit decides a behavior of the device for acquiring data from an object of which data for identification is insufficient.

(3-1) The information processing apparatus according to (3) described above,
in which the acquisition unit acquires whether data for identification of an object identified by the identification device is sufficient or insufficient, and
the decision unit decides a behavior of the device for acquiring data from the identified object, when a state in which data is insufficient is caused.

(3-2) The information processing apparatus according to (3) described above,
in which the acquisition unit acquires information regarding an object of which data for identification is insufficient, and
the decision unit decides a behavior of the device for acquiring data from an object of which data is insufficient.

(4) The information processing apparatus according to (3) described above,
in which the identification device includes a speaker identification device configured to identify a speaker from voice data of a user, and
the decision unit decides a behavior of the device for collecting voice data from a user whose voice data is insufficient.

(5) The information processing apparatus according to (4) described above,
in which the acquisition unit acquires whether voice data for user identification is sufficient or insufficient for each phonological voice or each phoneme, and
the decision unit decides a behavior of the device for collecting voice data including a lacking phonological voice or phoneme, from a user.

(6) The information processing apparatus according to any of (3) to (5) described above,
in which the identification device includes face identification device configured to identify a face image of a user, and
the decision unit decides a behavior of the device for collecting face image data of a user whose face image data is insufficient.

(7) The information processing apparatus according to (6) described above,
in which the acquisition unit acquires whether face data for user identification is sufficient or insufficient for each face orientation, and
the decision unit decides a behavior of the device for collecting a face image in a lacking face orientation.

(8) The information processing apparatus according to any of (3) to (7) described above,
in which the decision unit decides a behavior of the device for acquiring data from a user whose data for identification has become old.

(9) The information processing apparatus according to any of (1) to (8) described above, in which the acquisition unit acquires states of a plurality of identification devices, and
the decision unit decides a behavior of the device for acquiring data to be used by at least one of the plurality of identification devices for object identification, on the basis of respective states of the plurality of identification devices.

(10) The information processing apparatus according to (9) described above,
in which, in a case where data for identifying, by a second identification device, an object that has been identified by a first identification device is insufficient, the decision unit decides a behavior of the device for acquiring data to be used by the second identification device for identification, from the object.

(11) The information processing apparatus according to any of (9) or (10) described above,
in which, in a case where a checking score of data for identifying, by a second identification device, an object that has been identified by a first identification device is low, the decision unit decides a behavior of the device for acquiring data to be used by the second identification device, from the object.

(12) The information processing apparatus according to (11) described above,
in which the identification device includes a speaker identification device configured to identify a speaker from voice data of a user, and a face identification device configured to identify a face image of a user,
in a case where a checking score of voice data for identifying, as a speaker, a user whose face has been identified is low, the decision unit decides a behavior of the device for acquiring voice data from the user, and
in a case where a checking score of face image data for identifying a face of a user who has been identified as a speaker is low, the decision unit decides a behavior of the device for acquiring face image data from the user.

(13) The information processing apparatus according to (6) described above,
in which, in a case where an amount of data to be used by the identification device for identification of the user under a certain environment is insufficient, the decision unit decides a behavior of the device for acquiring data under the environment from the user.

(14) The information processing apparatus according to any of (4) to (10) described above,
in which the acquisition unit acquires a state of an identification device configured to identify a user on the basis of biological information, and
the decision unit decides a behavior of the device for acquiring biological information from a user whose biological information is insufficient.

(14-1) The information processing apparatus according to (14) described above,
in which the decision unit decides a behavior of the device for promoting a user whose heart rate signal is insufficient, to make contact.

(14-2) The information processing apparatus according to (14) described above,
in which the decision unit decides a behavior of the device for making it easier to acquire iris information from a user whose iris information is insufficient.

(15) The information processing apparatus according to any of (4) to (14) described above, further including
a determination unit configured to determine a decline in identification performance for the identification device identifying a user, in which the decision unit decides a behavior of the device for identifying a cause for a decline in the identification performance, and instructs the identification device to handle data newly acquired from a user along with a decline in the identification performance.

(16) The information processing apparatus according to (15) described above,
in which the decision unit generates a question sentence to the user for identifying a cause for a decline in the identification performance, and identifies a cause by analyzing a response from the user.

(17) The information processing apparatus according to according to any of (15) or (16) described above,
in which, in a case where the decision unit identifies that the cause is attributed to a temporary change of the user, the decision unit instructs the identification device to use newly-acquired data only temporarily.

(18) The information processing apparatus according to any of (15) to (17) described above,
in which, in a case where the decision unit identifies that the cause is attributed to a lasting or continuing change of the user, the decision unit instructs the identification device to replace with newly-acquired data.

(19) An information processing method for performing processing related to a device configured to autonomously behave to an object identified by an identification device, the information processing method including:
an acquisition step of acquiring a state of the identification device; and
a decision step of deciding a behavior of the device on the basis of the state.

(20) A robot apparatus including:
a sensor unit;
an identification unit configured to identify an object on the basis of an output of the sensor unit;
a driving unit; and
a decision unit configured to decide a behavior that uses the driving unit, on the basis of a state of the identification unit.

REFERENCE SIGNS LIST

1 Legged robot
2 Body exterior unit
3 Head exterior unit
4R/L Arm exterior unit
5R/L Leg exterior unit
11 Body unit
12 Head unit
13A, 13B Arm unit
14A, 14B Leg unit
21 Frame
22 Waist base
23 Waist joint mechanism
24 Body trunk roll axis
25 Body trunk pitch axis
26 Shoulder base
27 Neck joint mechanism
28 Neck pitch axis
29 Neck roll axis
30 Shoulder joint mechanism
31 Shoulder joint pitch axis
32 Shoulder joint roll axis
33 Elbow joint mechanism
34 Hand portion
35 Elbow joint yaw axis
36 Elbow joint pitch axis
37 Hip joint mechanism
38 Hip joint yaw axis
39 Hip joint roll axis
40 Hip joint pitch axis
41 Femoral region frame
42 Knee joint mechanism
43 Leg region frame
44 Ankle joint mechanism
45 Foot region
46 Knee joint pitch axis
47 Ankle joint pitch axis
48 Ankle joint roll axis
51 Touch sensor
52 Control unit
55 Display unit
61 Main control unit
61A Memory
62 Peripheral circuit
63A to 63D Sub control unit
71 External sensor unit
72 Speaker
73 Internal sensor unit
74 Battery
75 External memory
81L/R Camera
82 Microphone
91 Battery sensor
92 Acceleration sensor
101 State recognition information processing unit
101A Speech recognition unit
101a Control unit
101b Speaker identification unit
101C Pressure processing unit
101D Image recognition unit
102 Model storage unit
103 Behavior decision mechanism unit
104 Posture transition mechanism unit
105 Voice synthesis unit
121 Feature extraction unit
122 Matching unit
123 Acoustic model
124 Word dictionary
125 Language model
127 Speaker voice database
1101 Identification performance determination unit
1102 Identification performance storage unit
1103 Question generation unit
1104 Learning determination unit

The invention claimed is:

1. An information processing apparatus for performing processing related to a device configured to autonomously behave to an object identified by an identifier, the information processing apparatus comprising:
circuitry configured to:
acquire a state of the identifier;
decide a behavior of the device on a basis of the state;
determine a decline in identification performance for the identifier identifying a user; and
decide a behavior of the device for identifying a cause for a decline in identification performance, and control the identifier to handle data newly acquired from the user along with a decline in the identification performance,
wherein, in a case where the circuitry identifies that the cause is attributed to a temporary change of the user, the circuitry controls the identifier to use newly-acquired data only temporarily.

2. The information processing apparatus according to claim 1,
wherein the circuitry acquires identification performance of the identifier for an object, and
the circuitry decides a behavior of the device for resolving a cause for which the identification performance is low.

3. The information processing apparatus according to claim 1,
wherein the circuitry acquires a state of data to be used by the identifier for identification of an object, and
the circuitry decides a behavior of the device for acquiring data from an object of which data for identification is insufficient.

4. The information processing apparatus according to claim 3,
wherein the identifier includes a speaker identifier configured to identify a speaker from voice data of a user, and
the circuitry decides a behavior of the device for collecting voice data from a user whose voice data is insufficient.

5. The information processing apparatus according to claim 4,
wherein the circuitry acquires whether voice data for user identification is sufficient or insufficient for each phonological voice or each phoneme, and
the circuitry decides a behavior of the device for collecting voice data including a lacking phonological voice or phoneme, from a user.

6. The information processing apparatus according to claim 4,
wherein the circuitry acquires a state of an identifier configured to identify a user on a basis of biological information, and
the circuitry decides a behavior of the device for acquiring biological information from a user whose biological information is insufficient.

7. The information processing apparatus according to claim 4, wherein the circuitry generates a question sentence to the user for identifying a cause for a decline in the identification performance, and identifies a cause by analyzing a response from the user.

8. The information processing apparatus according to claim 4, wherein, in a case where the circuitry identifies that the cause is attributed to a lasting or continuing change of the user, the circuitry instructs the identifier to replace with newly-acquired data.

9. The information processing apparatus according to claim 3,
wherein the identifier includes a face identifier configured to identify a face image of a user, and
the circuitry decides a behavior of the device for collecting face image data of a user whose face image data is insufficient.

10. The information processing apparatus according to claim 9,
wherein the circuitry acquires whether face data for user identification is sufficient or insufficient for each face orientation, and
the circuitry decides a behavior of the device for collecting a face image in a lacking face orientation.

11. The information processing apparatus according to claim 9, wherein, in a case where an amount of data to be used by the identifier for identification of the user under a certain environment is insufficient, the circuitry decides a behavior of the device for acquiring data under the environment from the user.

12. The information processing apparatus according to claim 3,
wherein the circuitry decides a behavior of the device for acquiring data from a user whose data for identification has become old.

13. The information processing apparatus according to claim 1,
wherein the circuitry acquires states of a plurality of identifiers, and
the circuitry decides a behavior of the device for acquiring data to be used by at least one of the plurality of identifiers for object identification, on a basis of respective states of the plurality of identifiers.

14. The information processing apparatus according to claim 13,
wherein, in a case where data for identifying, by a second identifier, an object that has been identified by a first identifier is insufficient, the circuitry decides a behavior of the device for acquiring data to be used by the second identifier for identification, from the object.

15. The information processing apparatus according to claim 13,
wherein, in a case where a checking score of data for identifying, by a second identifier, an object that has been identified by a first identifier is low, the circuitry decides a behavior of the device for acquiring data to be used by the second identifier, from the object.

16. The information processing apparatus according to claim 15,
wherein the identifier includes a speaker identifier configured to identify a speaker from voice data of a user, and a face identifier configured to identify a face image of a user,
in a case where a checking score of voice data for identifying, as a speaker, a user whose face has been identified is low, the circuitry decides a behavior of the device for acquiring voice data from the user, and
in a case where a checking score of face image data for identifying a face of a user who has been identified as a speaker is low, the circuitry decides a behavior of the device for acquiring face image data from the user.

17. An information processing method for performing processing related to a device configured to autonomously behave to an object identified by an identifier, the information processing method comprising:
acquiring a state of the identifier;
deciding a behavior of the device on a basis of the state;
determining a decline in identification performance for the identifier identifying a user; and
deciding a behavior of the device for identifying a cause for a decline in identification performance, and controlling the identifier to handle data newly acquired from a user along with a decline in the identification performance,
wherein, in a case where it is identified that the cause is attributed to a temporary change of the user, controlling the identifier to use newly-acquired data only temporarily.

18. A robot apparatus comprising:
a sensor;
a driver;
circuitry configured to:
identify an object on a basis of an output of the sensor;
decide a behavior that uses the driver, on a basis of a state of the circuitry;
determine a decline in identification performance for the sensor identifying a user; and decide a behavior of the robot apparatus for identifying a cause for a decline in identification performance, and control the sensor to handle data newly acquired from a user along with a decline in the identification performance, wherein, in a case where the circuitry identifies that the cause is attributed to a temporary change of the user, the circuitry controls the identifier to use newly-acquired data only temporarily.

\* \* \* \* \*